United States Patent
Kim et al.

(10) Patent No.: US 9,439,090 B2
(45) Date of Patent: Sep. 6, 2016

(54) METHOD FOR MEASURING INTENSITY OF INTERFERENCE SIGNAL BASED ON CSI-RS IN WIRELESS COMMUNICATION SYSTEM AND APPARATUS FOR SAME

(71) Applicant: LG ELECTRONICS INC., Seoul (KR)

(72) Inventors: Hyungtae Kim, Anyang-si (KR); Jonghyun Park, Anyang-si (KR); Kijun Kim, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 50 days.

(21) Appl. No.: 14/377,702

(22) PCT Filed: Feb. 28, 2013

(86) PCT No.: PCT/KR2013/001633
§ 371 (c)(1),
(2) Date: Aug. 8, 2014

(87) PCT Pub. No.: WO2013/129863
PCT Pub. Date: Sep. 6, 2013

(65) Prior Publication Data
US 2015/0016292 A1 Jan. 15, 2015

Related U.S. Application Data

(60) Provisional application No. 61/604,477, filed on Feb. 28, 2012.

(51) Int. Cl.
*H04W 24/08* (2009.01)
*H04L 5/00* (2006.01)
(Continued)

(52) U.S. Cl.
CPC ............. *H04W 24/08* (2013.01); *H04B 7/024* (2013.01); *H04B 7/0632* (2013.01);
(Continued)

(58) Field of Classification Search
CPC H04B 7/0626; H04B 7/0632; H04B 1/1027;
H04L 5/0073; H04L 1/0687; H04L 1/0693;
H04L 27/2691; H04L 5/0048; H04L 5/0035;
H04W 28/0236; H04W 24/08
See application file for complete search history.

(56) References Cited

U.S. PATENT DOCUMENTS

| | | | |
|---|---|---|---|
| 2011/0199986 A1* | 8/2011 | Fong | H04L 5/0035 370/329 |
| 2011/0235743 A1 | 9/2011 | Lee et al. | |
| 2012/0106374 A1* | 5/2012 | Gaal | H04L 5/0048 370/252 |

(Continued)

FOREIGN PATENT DOCUMENTS

| | | |
|---|---|---|
| KR | 10-2011-0033079 A | 3/2011 |
| KR | 10-2011-0097623 A | 8/2011 |
| KR | 10-2011-0108284 A | 10/2011 |

OTHER PUBLICATIONS

CATT, "Important issues concerning CSI-RS for both FDD and TDD", 3GPP TSG RAN WG1 Meeting #59, R1-094547, Nov. 9-13, 2009, 5 pages provided.

(Continued)

*Primary Examiner* — Benjamin H Elliott, IV
(74) *Attorney, Agent, or Firm* — Birch, Stewart, Kolasch & Birch, LLP

(57) ABSTRACT

Disclosed is a method for measuring the intensity of an interference signal by a terminal in a wireless communication system. More particularly, a method for measuring the intensity of an interference signal from a first base station by a terminal in a coordinated multipoint (CoMP) environment comprises: a step of receiving a plurality of channel status information-reference signals (CSI-RSs) from a second base station; a step of receiving downlink signals output from a plurality of resource element (RE) pairs corresponding to the respective plurality of CSI-RSs from the first base station; and a step of measuring a plurality of interference intensities based on the plurality of CSI-RSs and the received downlink signals.

10 Claims, 17 Drawing Sheets

(51) Int. Cl.
*H04B 17/345* (2015.01)
*H04B 7/02* (2006.01)
*H04B 7/06* (2006.01)
*H04B 1/10* (2006.01)
*H04L 1/00* (2006.01)

(52) U.S. Cl.
CPC ......... *H04B 7/0684* (2013.01); *H04B 17/345* (2015.01); *H04L 5/0048* (2013.01); *H04B 1/1027* (2013.01); *H04L 1/0026* (2013.01)

(56) References Cited

U.S. PATENT DOCUMENTS

| | | | |
|---|---|---|---|
| 2012/0315859 A1 | 12/2012 | Lee et al. | |
| 2013/0078991 A1 | 3/2013 | Nam | |
| 2013/0182594 A1* | 7/2013 | Kim | H04W 72/042 370/252 |
| 2015/0016292 A1* | 1/2015 | Kim | H04B 7/024 370/252 |

\* cited by examiner (a) contol - plane protocol stack (b) user - plane protocol stack <Cell B>

<Cell C>

METHOD FOR MEASURING INTENSITY OF INTERFERENCE SIGNAL BASED ON CSI-RS IN WIRELESS COMMUNICATION SYSTEM AND APPARATUS FOR SAME

CROSS REFERENCE TO RELATED APPLICATIONS

This application is the National Phase of PCT International Application No. PCT/KR2013/001633, filed on Feb. 28, 2013, which claims priority under 35 U.S.C. 119(e) to U.S. Provisional Application No. 60/604,477, filed on Feb. 28, 2012, all of which are hereby expressly incorporated by reference into the present application.

TECHNICAL FIELD

The present invention relates to a wireless communication system, and more particularly, to a method of measuring strength of an interference signal based on a CSI-RS (channel status information-reference signal) in a wireless communication system and an apparatus therefor.

BACKGROUND ART

3GPP LTE ($3^{rd}$ generation partnership project long term evolution hereinafter abbreviated LTE) communication system is schematically explained as an example of a wireless communication system to which the present invention is applicable.

FIG. 1 is a schematic diagram of E-UMTS network structure as one example of a wireless communication system. E-UMTS (evolved universal mobile telecommunications system) is a system evolved from a conventional UMTS (universal mobile telecommunications system). Currently, basic standardization works for the E-UMTS are in progress by 3GPP. E-UMTS is called LTE system in general. Detailed contents for the technical specifications of UMTS and E-UMTS refers to release 7 and release 8 of "$3^{rd}$ generation partnership project; technical specification group radio access network", respectively.

Referring to FIG. 1, E-UMTS includes a user equipment (UE), an eNode B (eNB), and an access gateway (hereinafter abbreviated AG) connected to an external network in a manner of being situated at the end of a network (E-UTRAN). The eNode B may be able to simultaneously transmit multi data streams for a broadcast service, a multicast service and/or a unicast service.

One eNode B contains at least one cell. The cell provides a downlink transmission service or an uplink transmission service to a plurality of user equipments by being set to one of 1.25 MHz, 2.5 MHz, 5 MHz, 10 MHz, 15 MHz, and 20 MHz of bandwidths. Different cells can be configured to provide corresponding bandwidths, respectively. An eNode B controls data transmissions/receptions to/from a plurality of the user equipments. For a downlink (hereinafter abbreviated DL) data, the eNode B informs a corresponding user equipment of time/frequency region on which data is transmitted, coding, data size, HARQ (hybrid automatic repeat and request) related information and the like by transmitting DL scheduling information. And, for an uplink (hereinafter abbreviated UL) data, the eNode B informs a corresponding user equipment of time/frequency region usable by the corresponding user equipment, coding, data size, HARQ-related information and the like by transmitting UL scheduling information to the corresponding user equipment. Interfaces for user-traffic transmission or control traffic transmission may be used between eNode Bs. A core network (CN) consists of an AG (access gateway) and a network node for user registration of a user equipment and the like. The AG manages a mobility of the user equipment by a unit of TA (tracking area) consisting of a plurality of cells.

Wireless communication technologies have been developed up to LTE based on WCDMA. Yet, the ongoing demands and expectations of users and service providers are consistently increasing. Moreover, since different kinds of radio access technologies are continuously developed, a new technological evolution is required to have a future competitiveness. Cost reduction per bit, service availability increase, flexible frequency band use, simple structure/open interface and reasonable power consumption of user equipment and the like are required for the future competitiveness.

Meanwhile, it is anticipated that LTE-A system, which is a standard of a next generation mobile communication system, will support a CoMP (coordinated multi point) transmission scheme to enhance data transmission rate. In this case, the CoMP transmission method is a transmission method for two or more base stations or cells to communicate with the user equipment in a manner of cooperating with each other to enhance a communication performance between the user equipment situated at a radio shadow zone and the base station (a cell or a sector).

The extent of inter-cell interference in a CoMP environment is different from the extent of inter-cell interference in a normal environment. Moreover, since CoMP has various transmission schemes, the extent of inter-cell interference varies according to the various transmission schemes. Hence, it is required to have a method of more precisely measuring the extent of inter-cell interference in the CoMP environment.

DISCLOSURE OF THE INVENTION

Technical Task

Accordingly, the present invention intends to propose a method of measuring strength of an interference based on a CSI-RS in a wireless communication system and apparatus therefor in the following description based on the discussion as mentioned in the foregoing description.

Technical Solution

To achieve these and other advantages and in accordance with the purpose of the present invention, as embodied and broadly described, according to one embodiment, a method of measuring strength of an interference signal from a first eNode B, which is measured by a user equipment in a CoMP (coordinated multipoint) environment, includes the steps of receiving a plurality of CSI-RSs (channel status information-reference signals) from a second eNode B, receiving a downlink signal from a plurality of RE (resource element) pairs respectively corresponding to a plurality of the CSI-RSs from the first eNode B and measuring a plurality of interference strengths based on a plurality of the CSI-RSs and the received downlink signal.

Preferably, a plurality of the CSI-RSs are transmitted from the second eNode B via an identical antenna port.

And, the downlink signal received from a part of RE pairs among a plurality of the RE pairs may correspond to a muted signal.

In this case, if interference strengths are measured based on a part of the muted downlink signal, it may assume that there is no interference from the first eNode B.

And, each of a plurality of the RE pairs may occupy a position identical to a position of a corresponding CSI-RS on a frequency-time resource.

Moreover, the method may further include the step of calculating a plurality of CQIs (channel quality indicators) based on a measured plurality of the interference strengths.

And, the method may further include the step of reporting a calculated plurality of CQIs to the second eNode B.

To further achieve these and other advantages and in accordance with the purpose of the present invention, according to a different embodiment, a user equipment device measuring strength of an interference signal from a first eNode B in a CoMP (coordinated multipoint) environment includes a wireless communication module configured to transceive a signal with eNode Bs and a processor configured to access the wireless communication module and configured to control an operation of the user equipment device, the processor configured to receive a plurality of CSI-RSs (channel status information-reference signals) from a second eNode B via the wireless communication module, the processor configured to receive a downlink signal from a plurality of RE (resource element) pairs respectively corresponding to a plurality of the CSI-RSs from the first eNode B via the wireless communication module, the processor configured to measure a plurality of interference strengths based on a plurality of the CSI-RSs and the received downlink signal.

Advantageous Effects

According to embodiments of the present invention, a user equipment can measure strength of an interference signal under an assumption of various situations using a CSI-RS in CoMP environment of a wireless communication system.

Effects obtainable from the present invention may be non-limited by the above mentioned effect. And, other unmentioned effects can be clearly understood from the following description by those having ordinary skill in the technical field to which the present invention pertains.

BEST MODE

Mode for Invention

In the following description, compositions of the present invention, effects and other characteristics of the present invention can be easily understood by the embodiments of the present invention explained with reference to the accompanying drawings. Embodiments explained in the following description are examples of the technological features of the present invention applied to 3GPP system.

In this specification, the embodiments of the present invention are explained using an LTE system and an LTE-A system, which is exemplary only. The embodiments of the present invention are applicable to various communication systems corresponding to the above mentioned definition. In particular, although the embodiments of the present invention are described in the present specification on the basis of FDD, this is exemplary only. The embodiments of the present invention can be applied to H-FDD or TDD in a manner of being easily modified.

Figure 1:
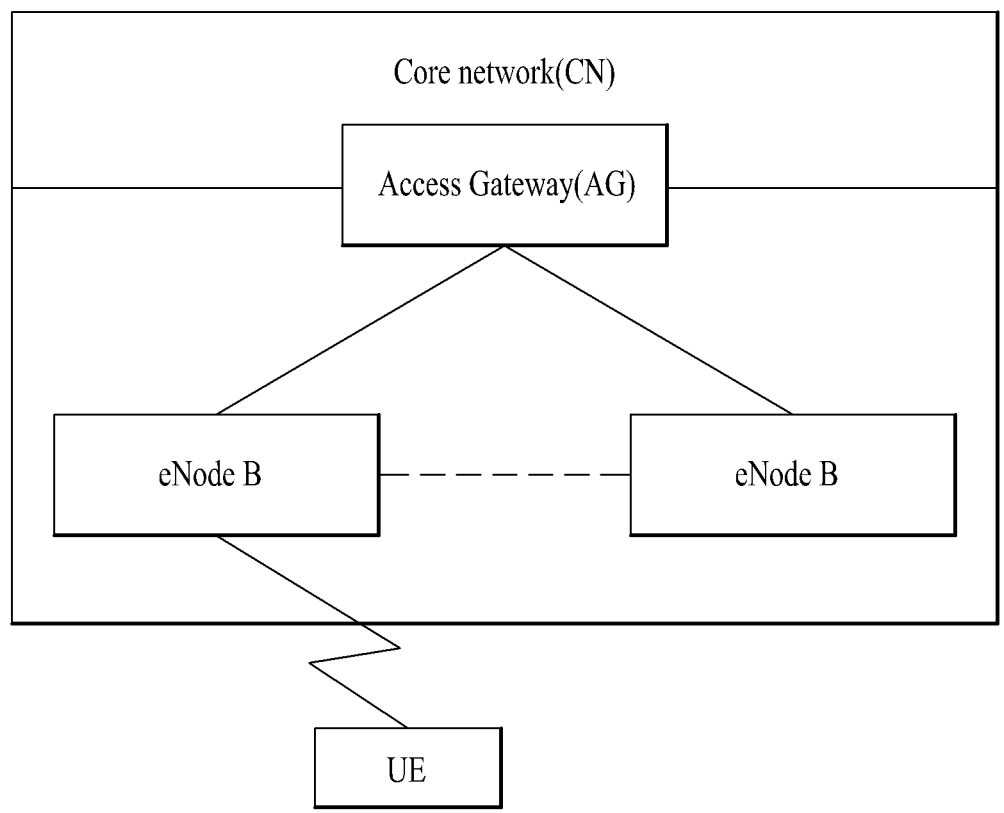
FIG. 1 is a schematic diagram of E-UMTS network structure as one example of a wireless communication system.
Figure 2:
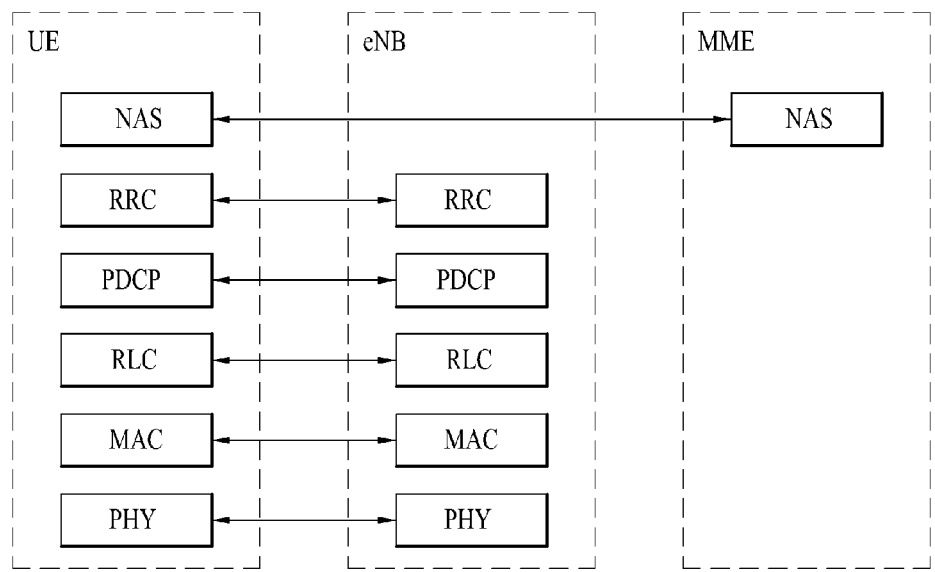
FIG. 2 is a diagram for structures of control and user planes of radio interface protocol between a 3GPP radio access network standard-based user equipment and E-UTRAN.
Figure 2:
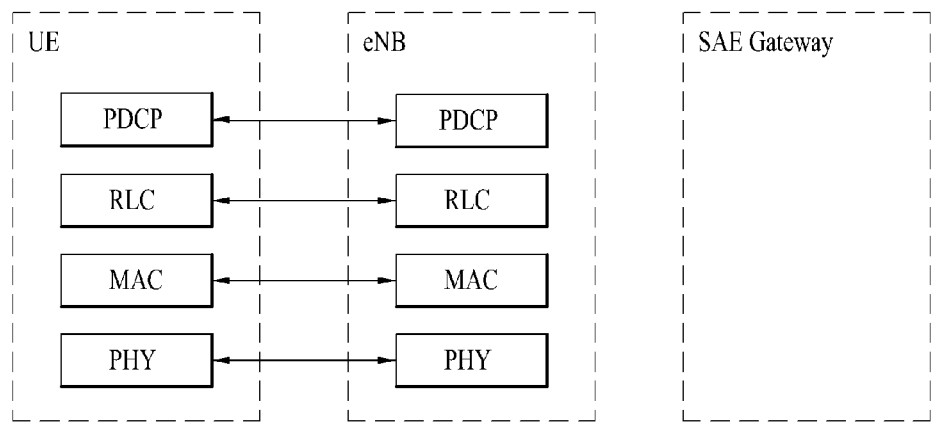

FIG. 2 is a diagram for structures of control and user planes of radio interface protocol between a 3GPP radio access network standard-based user equipment and E-UTRAN. The control plane means a path on which control messages used by a user equipment (UE) and a network to manage a call are transmitted. The user plane means a path on which such a data generated in an application layer as audio data, internet packet data, and the like are transmitted.

A physical layer, which is a $1^{st}$ layer, provides higher layers with an information transfer service using a physical channel. The physical layer is connected to a medium access control layer situated above via a transport channel. Data moves between the medium access control layer and the physical layer on the transport channel. Data moves between a physical layer of a transmitting side and a physical layer of a receiving side on the physical channel. The physical channel utilizes time and frequency as radio resources. Specifically, the physical layer is modulated by OFDMA (orthogonal frequency division multiple access) scheme in DL and the physical layer is modulated by SC-FDMA (single carrier frequency division multiple access) scheme in UL.

Medium access control (hereinafter abbreviated MAC) layer of a $2^{nd}$ layer provides a service to a radio link control (hereinafter abbreviated RLC) layer, which is a higher layer, on a logical channel. The RLC layer of the $2^{nd}$ layer supports a reliable data transmission. The function of the RLC layer may be implemented by a function block within the MAC. PDCP (packet data convergence protocol) layer of the $2^{nd}$ layer performs a header compression function to reduce unnecessary control information, thereby efficiently transmitting such IP packets as IPv4 packets and IPv6 packets in a narrow band of a radio interface.

Radio resource control (hereinafter abbreviated RRC) layer situated in the lowest location of a $3^{rd}$ layer is defined on a control plane only. The RRC layer is responsible for control of logical channels, transport channels and physical channels in association with a configuration, a re-configuration and a release of radio bearers (hereinafter abbreviated RBs). The RB indicates a service provided by the $2^{nd}$ layer for a data delivery between the user equipment and the network. To this end, the RRC layer of the user equipment and the RRC layer of the network exchange a RRC message with each other. In case that there is an RRC connection (RRC connected) between the user equipment and the RRC layer of the network, the user equipment lies in the state of RRC connected (connected mode). Otherwise, the user equipment lies in the state of RRC idle (idle mode). A non-access stratum (NAS) layer situated at the top of the RRC layer performs such a function as a session management, a mobility management and the like.

A single cell consisting of an eNode B is set to one of 1.25 MHz, 2.5 MHz, 5 MHz, 10 MHz, 15 MHz, and 20 MHz of bandwidths and then provides a downlink or uplink transmission service to a plurality of user equipments. Different cells can be configured to provide corresponding bandwidths, respectively.

DL transport channels for transmitting data from a network to a user equipment include a BCH (broadcast channel) for transmitting a system information, a PCH (paging channel) for transmitting a paging message, a downlink SCH (shared channel) for transmitting a user traffic or a control message and the like. DL multicast/broadcast service traffic or a control message may be transmitted on the DL SCH or a separate DL MCH (multicast channel). Meanwhile, UL transport channels for transmitting data from a user equipment to a network include a RACH (random access channel) for transmitting an initial control message, an uplink SCH (shared channel) for transmitting a user traffic or a control message. A logical channel, which is situated above a transport channel and mapped to the transport channel, includes a BCCH (broadcast channel), a PCCH (paging control channel), a CCCH (common control channel), a MCCH (multicast control channel), a MTCH (multicast traffic channel) and the like.

Figure 3:
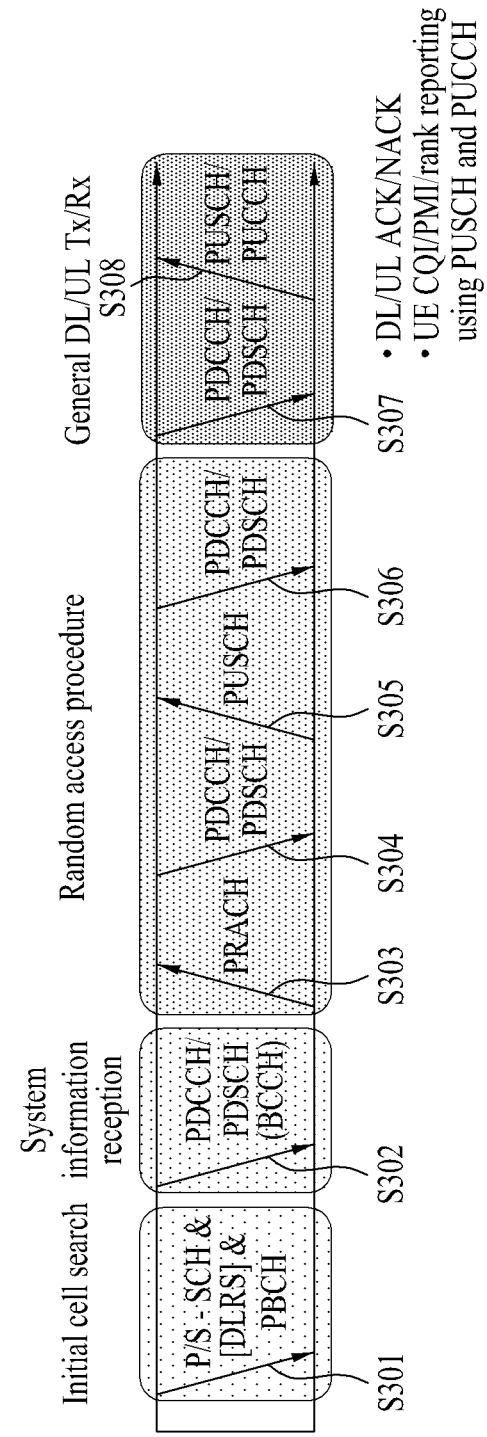
FIG. 3 is a diagram for explaining physical channels used for 3GPP system and a general signal transmission method using the physical channels.

FIG. 3 is a diagram for explaining physical channels used for 3GPP system and a general signal transmission method using the physical channels.

If a power of a user equipment is turned on or the user equipment enters a new cell, the user equipment may perform an initial cell search job for matching synchronization with an eNode B and the like [S301]. To this end, the user equipment may receive a primary synchronization channel (P-SCH) and a secondary synchronization channel (S-SCH) from the eNode B, may be synchronized with the eNode B and may be then able to obtain information such as a cell ID and the like. Subsequently, the user equipment receives a physical broadcast channel from the eNode B and may be then able to obtain intra-cell broadcast information. Meanwhile, the user equipment receives a downlink reference signal (DL RS) in the initial cell search step and may be then able to check a DL channel state.

Having completed the initial cell search, the user equipment may receive a physical downlink shared control channel (PDSCH) according to a physical downlink control channel (PDCCH) and an information carried on the physical downlink control channel (PDCCH). The user equipment may be then able to obtain detailed system information [S302].

Meanwhile, if a user equipment initially accesses an eNode B or does not have a radio resource for transmitting a signal, the user equipment may be able to perform a random access procedure (RACH) to complete the access to the eNode B [S303 to S306]. To this end, the user equipment may transmit a specific sequence as a preamble on a physical random access channel (PRACH) [S303/S305] and may be then able to receive a response message on PDCCH and the corresponding PDSCH in response to the preamble [S304/S306]. In case of a contention based random access procedure (RACH), it may be able to additionally perform a contention resolution procedure.

Having performed the above mentioned procedures, the user equipment may be able to perform a PDCCH/PDSCH reception [S307] and a PUSCH/PUCCH (physical uplink shared channel/physical uplink control channel) transmission [S308] as a general uplink/downlink signal transmission procedure. In particular, the user equipment receives a DCI (downlink control information) on the PDCCH. In this case, the DCI contains such a control information as an information on resource allocation to the user equipment. The format of the DCI varies in accordance with its purpose.

Meanwhile, control information transmitted to an eNode B from a user equipment via UL or the control information received by the user equipment from the eNode B includes downlink/uplink ACK/NACK signals, CQI (Channel Quality Indicator), PMI (Precoding Matrix Index), RI (Rank Indicator) and the like. In case of 3GPP LTE system, the user equipment may be able to transmit the aforementioned control information such as CQI/PMI/RI and the like on PUSCH and/or PUCCH.

Figure 4:
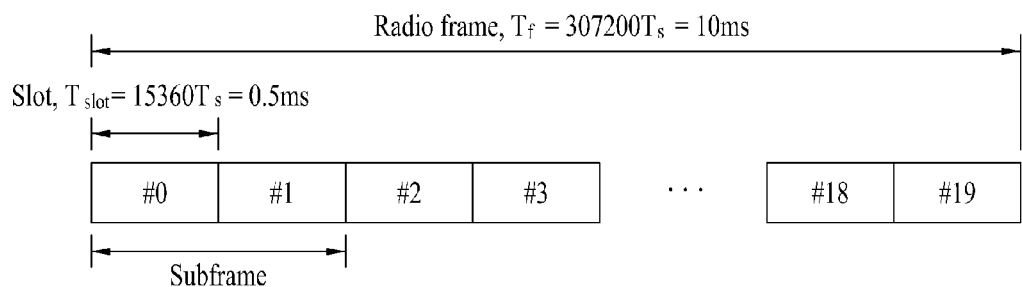
FIG. 4 is a diagram for a structure of a radio frame in LTE system.

FIG. 4 is a diagram for a structure of a radio frame used in an LTE system.

Referring to FIG. 4, one radio frame has a length of 10 ms ($327,200 \times T_s$) and is constructed with 10 subframes in equal size. Each of the subframes has a length of 1 ms and is constructed with two slots. Each of the slots has a length of 0.5 ms ($15,360 \times T_s$). In this case, $T_s$ indicates a sampling time and is represented as $T_s=1/(15 \text{ kHz} \times 2048)=3.2552 \times 10^{-8}$ (i.e., about 33 ns). The slot includes a plurality of OFDM symbols in a time domain and also includes a plurality of resource blocks (RBs) in a frequency domain. In the LTE system, one resource block includes '12 subcarriers×7 or 6 OFDM symbols'. A transmission time interval (TTI), which is a unit time for transmitting data, can be determined by at least one subframe unit. The aforementioned structure of a radio frame is just exemplary. And, the number of subframes included in a radio frame, the number of slots included in a subframe and the number of OFDM symbols included in a slot may be modified in various ways.

Figure 5:
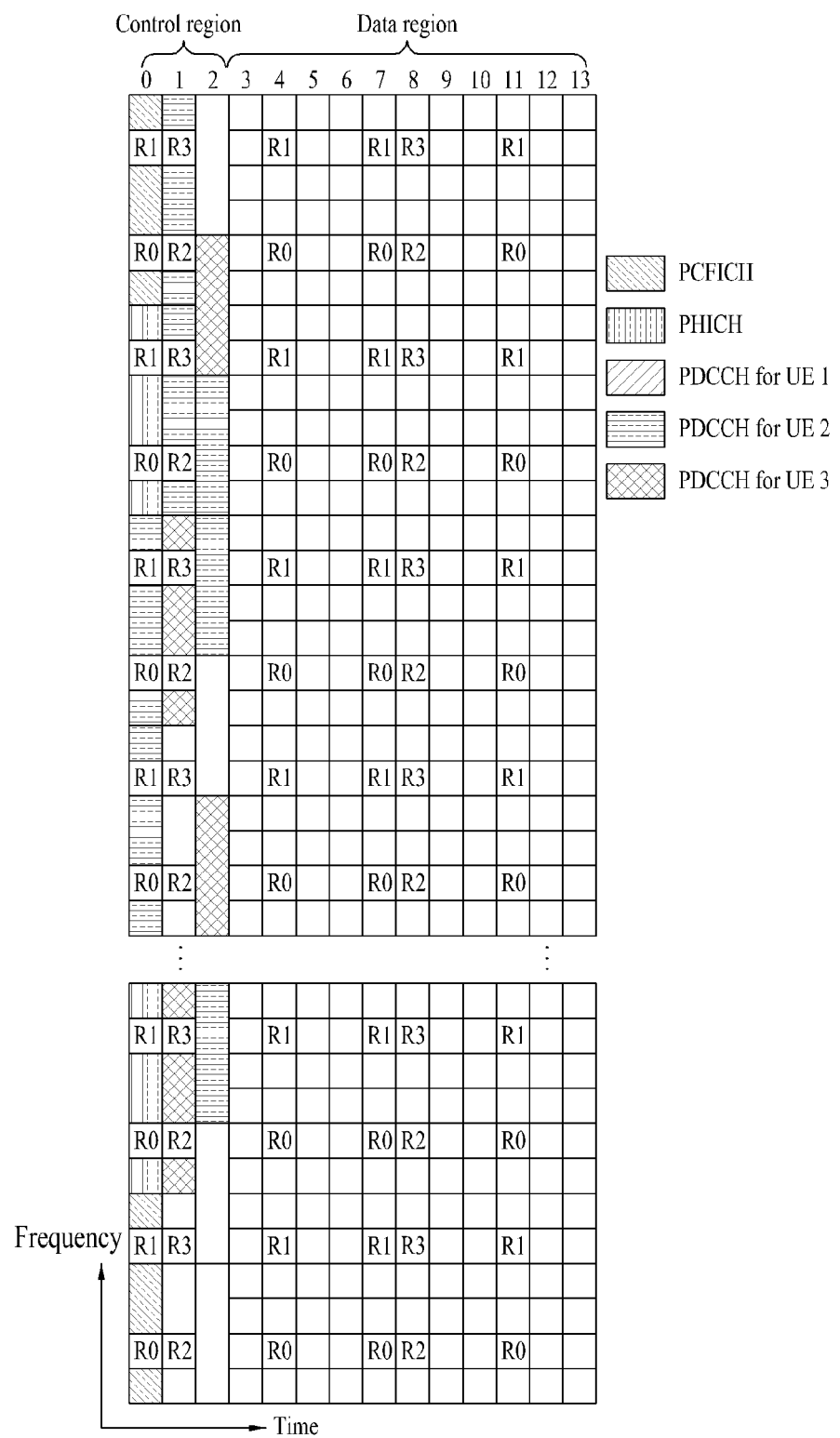
FIG. 5 is a diagram for a structure of a downlink radio frame in LTE system.

FIG. 5 is a diagram for showing an example of a control channel included in a control region of a single subframe in a DL radio frame.

Referring to FIG. 5, a subframe consists of 14 OFDM symbols. According to a subframe configuration, the first 1 to 3 OFDM symbols are used for a control region and the other 13~11 OFDM symbols are used for a data region. In the diagram, R1 to R4 may indicate a reference signal (hereinafter abbreviated RS or a pilot signal) for an antenna 0 to 3. The RS is fixed as a constant pattern in the subframe irrespective of the control region and the data region. The control channel is allocated to a resource to which the RS is not allocated in the control region and a traffic channel is also allocated to a resource to which the RS is not allocated in the data region. The control channel allocated to the control region may include a physical control format indicator channel (PCFICH), a physical hybrid-ARQ indicator channel (PHICH), a physical downlink control channel (PDCCH) and the like.

The PCFICH is a physical control format indicator channel and informs a user equipment of the number of OFDM symbols used for the PDCCH on every subframe. The PCFICH is situated at the first OFDM symbol and is configured prior to the PHICH and the PDCCH. The PCFICH consists of 4 resource element groups (REG) and each of the REGs is distributed in the control region based on a cell ID (cell identity). One REG consists of 4 resource elements (RE). The RE may indicate a minimum physical resource defined as 'one subcarrier×one OFDM symbol'. The value of the PCFICH may indicate the value of 1 to 3 or 2 to 4 according to a bandwidth and is modulated into a QPSK (quadrature phase shift keying).

The PHICH is a physical HARQ (hybrid-automatic repeat and request) indicator channel and used for carrying HARQ ACK/NACK for an UL transmission. In particular, the PHICH indicates a channel to which DL ACK/NACK information is transmitted for UL HARQ. The PHICH consists of a single REG and is scrambled cell-specifically. The ACK/NACK is indicated by 1 bit and modulated into BPSK (binary phase shift keying). The modulated ACK/NACK is spread into a spread factor (SF) 2 or 4. A plurality of PHICHs, which are mapped to a same resource, composes a PHICH group. The number of PHICH, which is multiplexed by the PHICH group, is determined according to the number of spreading code. The PHICH (group) is repeated three times to obtain diversity gain in a frequency domain and/or a time domain.

The PDCCH is a physical DL control channel and is allocated to the first n OFDM symbol of a subframe. In this case, the n is an integer more than 1 and indicated by the PCFICH. The PDCCH consists of at least one CCE. The PDCCH informs each of user equipments or a user equipment group of an information on a resource assignment of PCH (paging channel) and DL-SCH (downlink-shared channel), which are transmission channels, an uplink scheduling grant, HARQ information and the like. The PCH (paging channel) and the DL-SCH (downlink-shared channel) are transmitted on the PDSCH. Hence, an eNode B and the user equipment transmit and receive data via the PDSCH in general except a specific control information or a specific service data.

Information on where the data of the PDSCH is transmitted to which user equipment (one or a plurality of user equipments) and the information on how to receive and decode the PDSCH data by the user equipments and the like are transmitted in a manner of being included in the PDCCH. For instance, assume that a specific PDCCH is CRC masked with an RNTI (radio network temporary identity) called "A" and an information on data transmitted using a radio resource (e.g., frequency position) called "B" and a DCI format i.e., a transmission form information (e.g., a transmission block size, a modulation scheme, coding information, and the like) called "C" is transmitted via a specific subframe. In this case, the user equipment in a cell monitors the PDCCH using the RNTI information of its own, if there exist at least one or more user equipments having the "A" RNTI, the user equipments receive the PDCCH and the PDSCH, which is indicated by the "B" and the "C", via the received information on the PDCCH.

Figure 6:
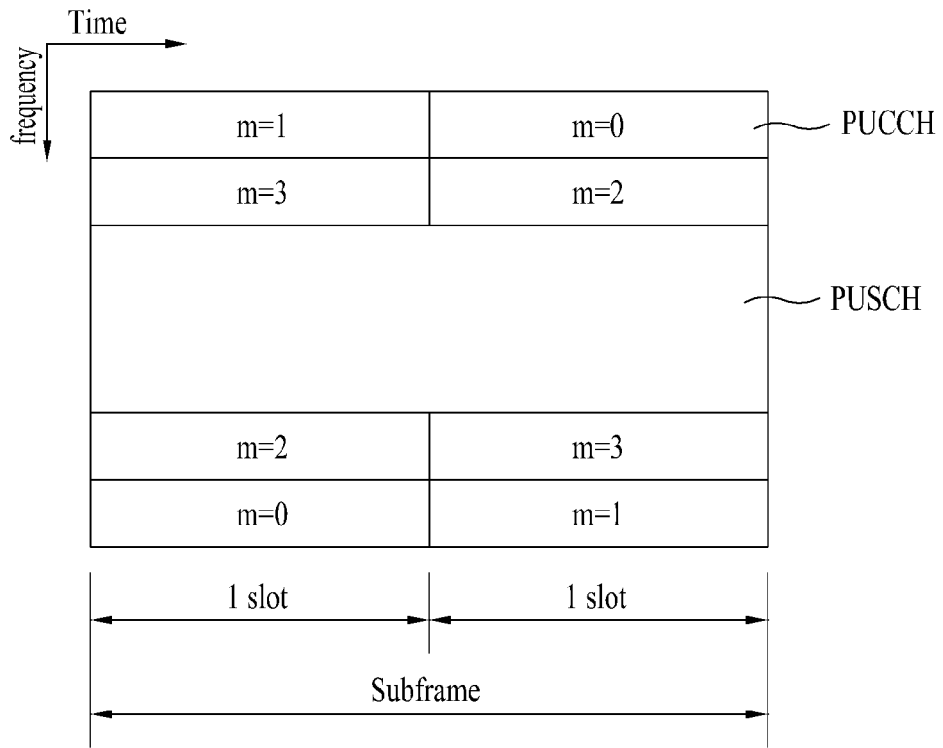
FIG. 6 is a diagram for a structure of an uplink subframe used in LTE system.

FIG. 6 is a diagram for a structure of an uplink subframe used in LTE system.

Referring to FIG. 6, an UL subframe can be divided into a region to which a physical uplink control channel (PUCCH) carrying control information is assigned and a region to which a physical uplink shared channel (PUSCH) carrying a user data is assigned. A middle part of the subframe is assigned to the PUSCH and both sides of a data region are assigned to the PUCCH in a frequency domain. The control information transmitted on the PUCCH includes an ACK/NACK used for HARQ, a CQI (channel quality indicator) indicating a DL channel status, an RI (rank indicator) for MIMO, an SR (scheduling request) corresponding to an UL resource request, and the like. The PUCCH for a single UE uses one resource block, which occupies different frequencies in each slot within a subframe. In particular, 2 resource blocks assigned to the PUCCH are frequency hopped on a slot boundary. In particular, FIG. 6 shows an example that the PUCCH satisfying conditions (e.g., m=0, 1, 2, 3) is assigned to a subframe.

In the following description, MIMO system is explained. The MIMO (multiple-input multiple-output) is a method using a plurality of transmitting antennas and a plurality of receiving antennas. The efficiency in transmitting and receiving data may be enhanced by the MIMO. In particular, by using a plurality of the antennas at a transmitting end or a receiving end in a radio communication system, it may be able to increase a capacity and enhance performance. In the following description, the MIMO may be called a 'multi-antenna'.

In the multiple antenna technology, it may not depend on a single antenna path to receive a whole message. Data is completed in a manner of combining data fragments received from many antennas in one place in the multiple antenna technology instead. When the multiple antenna technology is used, a data transmission speed may be enhanced in a cell area having a specific size or a system coverage may be enlarged while a specific data transmission speed is secured. And, this technology is widely used in a mobile communication terminal, a relay station, and the like. According to the multiple antenna technology, a throughput limitation of a single antenna used by a conventional technology in a mobile communication can be overcome.

Figure 7:
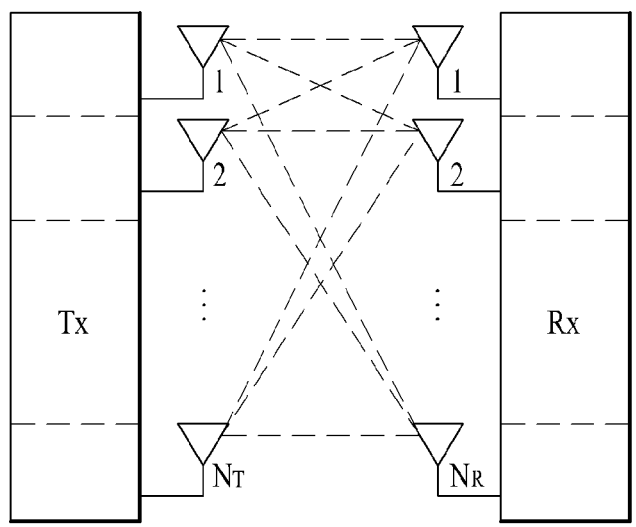
FIG. 7 is a block diagram of a general multi-antenna (MIMO) communication system.

A block diagram of a general multi-antenna communication system is depicted in FIG. 7. $N_T$ number of transmitting antenna is installed in a transmitting end and $N_R$ number of receiving antenna is installed in a receiving end. As described in the above, in case that both the transmitting end and the receiving end use plural number of antennas, a theoretical channel transmission capacity is increased compared to a case that the plural number of antennas are only used for either the transmitting end or the receiving end. The increase of the channel transmission capacity is proportional to the number of antenna. Thus, a transfer rate is enhanced and frequency efficiency is enhanced. If a maximum transfer rate is represented as $R_o$ in case of using a single antenna, the transfer rate using multiple antennas can be theoretically increased as much as the maximum transfer rate $R_o$ multiplied by a rate of increase $R_i$, as shown in the following Formula 1. In this case, the $R_i$ is a smaller value of the $N_T$ and the $N_R$.

$$R_i = \min(N_T, N_R) \qquad \text{[Formula 1]}$$

For instance, MIMO communication system using 4 transmitting antennas and 4 receiving antennas may be able to theoretically obtain the transfer rate of 4 times of a single antenna system. After the theoretical capacity increase of the multi-antenna system is proved in the mid-90s, various technologies for practically enhancing a data transmission rate have been actively studied up to date and several technologies among them are already reflected in such a various wireless communication standard as a 3$^{rd}$ generation mobile communication, a next generation wireless LAN and the like.

If we look at the research trend related to the multi-antenna until now, many active researches have been performed for such a study of various points of view as a study on information theory related to a multi-antenna communication capacity calculation in various channel environments and multiple access environment, a study on a radio channel measurement and model deduction of the multi-antenna system, a study on a space-time signal processing technology for enhancing a transmission reliability and a transmission rate, and the like.

In case of mathematically modeling a communication method of the multi-antenna system in order to explain it with more specific way, it can be represented as follows. As shown in FIG. 7, assume that there exist $N_T$ number of transmitting antenna and $N_R$ number of receiving antenna. First of all, if we look into a transmission signal, since the maximum number of information capable of being transmitted is $N_T$ in case that there exists $N_T$ number of transmitting antenna, transmission information can be represented as a vector in the following Formula 2.

$$s = [s_1, s_2, \ldots, s_{N_T}]^T \qquad \text{[Formula 2]}$$

Meanwhile, for each of the transmission informations $s_1, s_2, \ldots, s_{N_T}$, a transmit power may be differentiated according to the each of the transmission informations. In this case, if each of the transmit powers is represented as $P_1, P_2, \ldots, P_{N_T}$, transmit power-adjusted transmission information can be represented as a vector in the following Formula 3.

$$\hat{s} = [\hat{s}_1, \hat{s}_2, \ldots, \hat{s}_{N_T}]^T = [P_1 s_1, P_2 s_1, \ldots, P_{N_T} s_{N_T}]^T \qquad \text{[Formula 3]}$$

And, if $\hat{s}$ is represented using a diagonal matrix P, it can be represented as a following Formula 4.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} \qquad \text{[Formula 4]}$$

$$= Ps$$

Meanwhile, let's consider a case that the $N_T$ number of transmission signal $x_1, x_2, \ldots, x_{N_T}$, which is practically transmitted, is configured in a manner of applying a weighted matrix W to the adjusted information vectors $\hat{S}$. In this case, the weighted matrix performs a role of distributing the transmission information to each of the antennas according to the situation of the transmission channel and the like. The transmission signal $x_1, x_2, \ldots, x_{N_T}$ can be represented using a vector X in the following Formula 5. In this case, $W_{ij}$ means a weighting between an $i^{th}$ transmitting antenna and $j^{th}$ information. The W is called the weighted matrix or a precoding matrix.

$$x = \begin{bmatrix} x_1 \\ x_2 \\ \vdots \\ x_i \\ \vdots \\ x_{N_T} \end{bmatrix} \qquad \text{[Formula 5]}$$

$$= \begin{bmatrix} w_{11} & w_{12} & \cdots & w_{1N_T} \\ w_{21} & w_{22} & \cdots & w_{2N_T} \\ \vdots & & \ddots & \\ w_{i1} & w_{i2} & \cdots & w_{iN_T} \\ \vdots & & \ddots & \\ w_{N_T1} & w_{N_T2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix}$$

$$= W\hat{s}$$

$$= WPs$$

In general, a physical meaning of a rank of a channel matrix may indicate a maximum number capable of transmitting different information from each other in a given channel. Hence, since the rank of the channel matrix is defined by a minimum number of the numbers of row or column independent from each other, the rank of the matrix is configured not to be greater than the number of the row or the column. For instance, the rank of a channel matrix H (rank (H)) is limited as shown in Formula 6.

$$\text{rank}(H) \leq \min(N_T, N_R) \qquad \text{[Formula 6]}$$

And, let's define each of the informations different from each other, which are transmitted using a multi-antenna technology, as a transport stream or simply a stream. The stream can be named a layer. Then, the number of the transport stream is naturally configured not to be greater than the rank of the channel, which is a maximum number capable of transmitting informations different from each other. Hence, the channel matrix H can be represented as Formula 7 in the following.

$$\# \text{ of streams} \leq \text{rank}(H) \leq \min(N_T, N_R) \qquad \text{[Formula 7]}$$

In this case, '# of streams' indicates the number of streams. Meanwhile, in this case, it should be cautious that one stream can be transmitted via more than one antenna.

Various methods making one or more streams correspond to many antennas may exist. These methods can be described in accordance with the kind of the multi-antenna technology in the following description. A case of transmitting one stream via many antennas may be called a space diversity scheme and a case of transmitting many streams via many antennas may be called a space multiplexing scheme. Naturally, a hybrid form of the space diversity and the space multiplexing is also available.

In the following, a reference signal is explained.

When a packet is transmitted in a wireless communication system, since the packet is transmitted via a radio channel, a signal may be distorted in the course of transmission. In order for a receiving end to correctly receive a distorted signal, it may be preferable that the distorted and received signal is corrected using channel information. In order to find out the channel information, a signal known to both a transmitting end and the receiving end is transmitted and the channel information is found out with the extent of distortion when the signal is received on a channel. The signal known to both the receiving end and the transmitting end is called a pilot signal or a reference signal.

Recently, when a packet is transmitted, most of mobile communication systems intend to enhance transmission and reception efficiency by selecting multiple transmitting antennas and multiple receiving antennas instead of using a single transmitting antenna and a single receiving antenna. In case that a transmitting end or a receiving end intends to increase capacity or improve performance using multiple antennas, the transmitting end or the receiving end can receive a correct signal when a channel status between a transmitting antenna and a receiving antenna is known only. Hence, a separate reference signal should exist according to each transmitting antenna.

In a mobile communication system, a reference signal (RS) is mainly classified into two types in accordance with a purpose of the RS. One type of the RS is used to obtain channel information and another type of the RS is used to demodulate data. Since the former one is the RS to make a UE obtain DL channel information, it is transmitted in wideband. Although a UE does not receive DL data in a specific subframe, the UE should receive and measure the corresponding RS. This sort of RS can also be used for performing a measurement for a handover and the like.

In case that a base station transmits a resource in DL, the latter one corresponds to an RS transmitted together with the resource. A UE can perform channel estimation by receiving the RS and may be then able to demodulate data. This sort of RS should be transmitted to a region to which the data is transmitted.

LTE system defines two types of downlink RS for a unicast service. Specifically, one is a common RS (CRS) used for obtaining information on a channel status and performing measurement related to handover and the like and another is a dedicated RS (DRS) used for data demodulation. In this case, the CRS is also called a cell-specific RS and the DRS is also called a UE-specific.

In LTE system, the DRS is only used for the use of data demodulation and the CRS can be used for two purposes, i.e., obtaining channel information and performing data demodulation. The CRS is transmitted in every subframe over a wide band as a cell-specific reference signal. And, the CRS is transmitted based on maximum 4 antenna ports depending on the number of transmitting antenna of a base station. For instance, if the number of transmitting antenna of the base station corresponds to 2, the CRS for an antenna port 0 and the CRS for an antenna port 1 are transmitted. If the number of transmitting antenna of the base station corresponds to 4, the CRSs for an antenna port 0 to 3 are transmitted, respectively.

Figure 8:
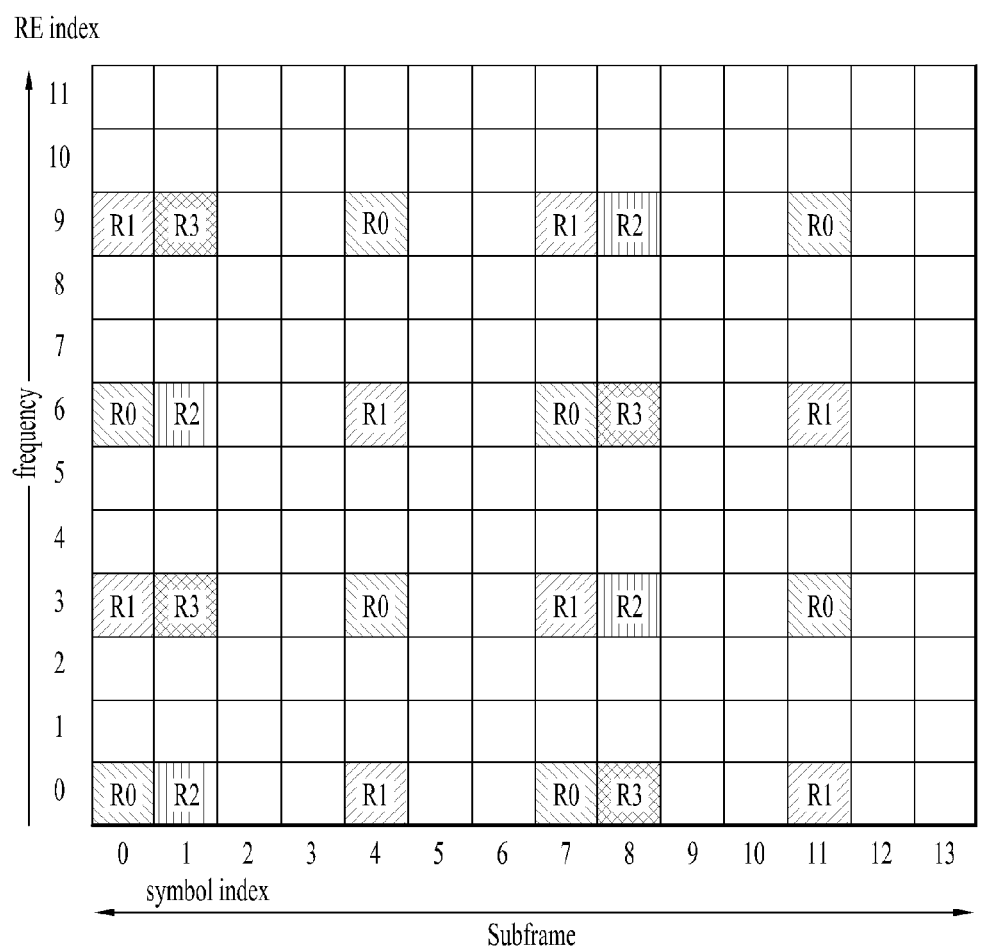
FIG. 8 is a diagram for an example of a general CRS pattern in case that there exist 4 transmission antennas in LTE system.

FIG. 8 is a diagram for an example of a general CRS pattern in case that there exist 4 transmission antennas in LTE system.

Referring to FIG. 8, if a CRS is mapped to a time-frequency resource in LTE system, a reference signal for one antenna port is transmitted in a manner of being mapped to one RE per 6REs on a frequency axis. Since one RB includes 12 REs on the frequency, regarding RE for one antenna port, 2 REs are used per one RB.

Figure 9:
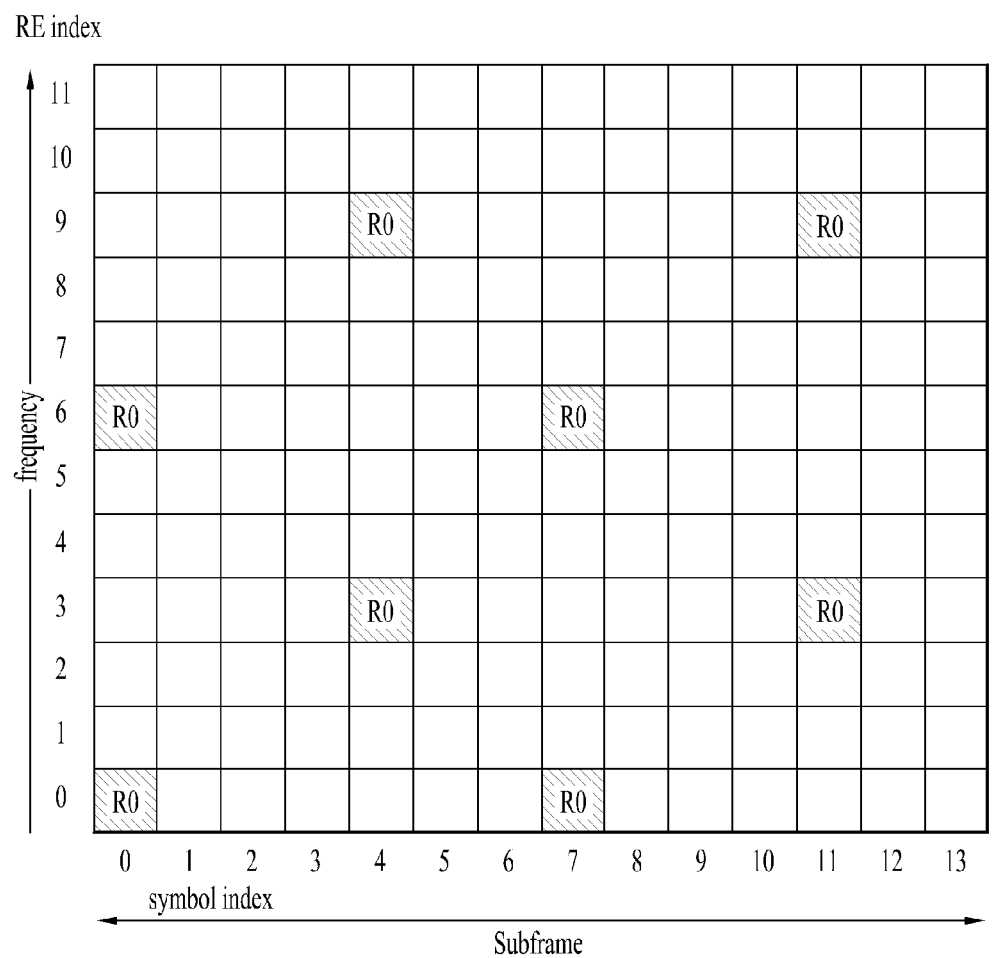
FIG. 9 is a diagram for an example of a CRS pattern for a transmission antenna port 0 in LTE system.

FIG. 9 is a diagram for an example of a CRS pattern for a transmission antenna port 0 in LTE system.

Meanwhile, in LTE-A system, which is an evolved version of LTE system, a base station should be designed to support maximum 8 transmitting antennas in DL. Hence, it is also necessary to support RS for the maximum 8 transmitting antennas.

Specifically, since a downlink RS is defined for maximum 4 antenna ports only in LTE system, if a base station includes more than 4 and maximum 8 DL transmitting antennas in LTE-A system, it is necessary to additionally define RS for the antenna ports. Regarding the RS for the maximum 8 transmitting antenna ports, it should consider both the RS used for channel measurement and the RS used for data demodulation.

One of the important considerations in designing LTE-A system is backward compatibility. The backward compatibility means to support a legacy LTE UE to properly operate in LTE-A system and the system should support the LTE UE as well. In terms of a transmission of an RS, RS for the maximum 8 transmitting antenna ports should be additionally defined in time-frequency domain where a CRC is transmitted. Yet, if a RS pattern for the maximum 8 transmitting antennas is added to whole band in every subframe in LTE-A system with a scheme such as the CRS of a legacy LTE system, RS overhead becomes considerably big.

Hence, a newly designed RS in LTE-A system can be mainly classified into two types. One is a channel state information RS (CSI-RS) used for a purpose of channel measurement to select a modulation and coding scheme (MCS), precoding matrix index (PMI) and the like. Another one is a demodulation RS (DM RS) used for a purpose of demodulating data transmitted via the maximum 8 transmitting antennas.

Unlike the CRS in the legacy LTE system used for the purpose of demodulating data as well as measuring for channel estimation, handover, and the like, the CSI-RS used for the purpose of channel measurement is mainly designed for the purpose of measuring for channel estimation. Unlike the CRS in the legacy LTE system, since the CSI-RS is transmitted to obtain information on a channel state only, it is not necessary to transmit the CSI-RS in every subframe. According to a current LTE-A standard, the CSI-RS can be assigned to an antenna port 15 to 22 and CSI-RS configuration information is received via an upper layer signaling.

And, for data demodulation, a DM RS as a dedicated reference signal is transmitted to a UE in which data transmission is scheduled in a corresponding time-frequency domain. In particular, the DM RS transmitted to a specific UE can be transmitted to a region in which the UE is scheduled, i.e., time-frequency domain to which data on the UE is transmitted only.

Meanwhile, it is expected that a LTE-A system, which is a standard of a next generation mobile communication system, will support a CoMP (coordinated multi point) transmission method, which is not supported by the conventional standard, to enhance a data transmission rate. In this case, the CoMP transmission method is a transmission method for two or more base stations or cells to communicate with the user equipment in a manner of cooperating with each other to enhance a communication performance between the user equipment situated at a radio shadow zone and the base station (a cell or a sector).

The CoMP transmission method can be classified into a join processing (CoMP-joint processing, CoMP-JP) method in the form of a cooperative MIMO via data sharing and a coordinated scheduling/beamforming (CoMP-coordinated scheduling/beamforming, CoMP-CS/CB) method.

According to the joint processing (CoMP-JP) method in DL, a user equipment may be able to instantaneously receive data simultaneously from each of the base stations performing the CoMP transmission method. And, a reception performance can be enhanced in a manner of combining the signals received from each of the base stations (Joint Transmission (JT)). And, it is also possible to consider a method of transmitting a data to the user equipment on a specific timing by one of the base stations performing the CoMP transmission method (Dynamic Point Selection (DPS)). On the other hand, according to the coordinated scheduling/beamforming method (CoMP-CS/CB), the user equipment may be able to instantaneously receive data from a single base station via a beamforming.

According to the joint processing (CoMP-JP) method in UL, each of the base stations may be able to simultaneously receive PUSCH signal from the user equipment (Joint Reception (JR)). On the other hand, according to the coordinated scheduling/beamforming method (CoMP-CS/CB), only a single base station may be able to receive the PUSCH. In this case, the decision to use the coordinated scheduling/beamforming method is determined by the coordinating cells (or base stations).

Meanwhile, the CoMP scheme can be applied to not only a homogeneous network consisting of a macro eNB only but also a heterogeneous network.

Figure 10:
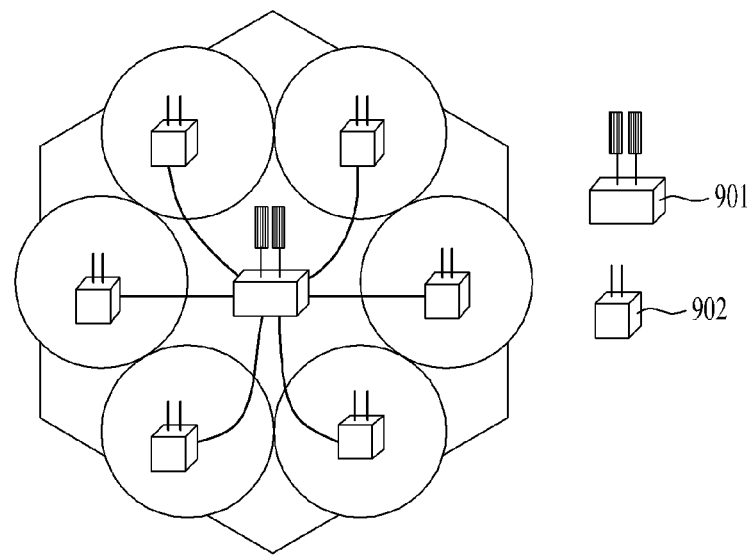
FIG. 10 is a diagram for an example of a structure of a heterogeneous network to which a CoMP scheme is applicable.

FIG. 10 is a diagram for an example of a structure of a heterogeneous network to which a CoMP scheme is applicable. In particular; FIG. 10 depicts a network including a macro eNB 901 and a RRH (radio remote head) and the like 902 transceiving a signal with a relatively low transmit power. In this case, a pico eNB or the RRH positioned within coverage of the macro eNB can be connected with the macro eNB with an optical cable and the like. And, the RRH may be called a micro eNB.

Referring to FIG. 10, since transmit power of such a micro eNB as the RRH is relatively lower than the transmit power of a macro eNB, coverage of each of the RRHs is relatively smaller than the coverage of the macro eNB.

Unlike a system at which a legacy macro eNB exist only, what a CoMP scenario intends to seek is to cover a coverage hole of a specific region via the RRHs added to a system or to increase a total system throughput via a cooperative transmission in a manner of utilizing a plurality of transmission points (TP) including the RRH and the macro eNB.

Meanwhile, in FIG. 10, the RRHs can be classified into two types. One type corresponds to a case that each of the RRHs receives a cell ID different from a cell ID of the macro eNB. Hence, each of the RHHs can be regarded as a small cell different from the macro eNB, respectively. Another type may correspond to a case that each of the RRHs operates in a manner of having a cell ID identical to a cell ID of the macro eNB.

In case that each of the RRHs and the macro eNB has a cell ID different from each other, a UE recognizes each of the RRHs and the macro eNB as an independent cell, respectively. In this case, the UE located at a boundary of each cell is severely interfered by a neighboring cell. In order to reduce the interference and increase transfer rate, various kinds of CoMP schemes have been proposed.

Subsequently, in case that each of the RRHs and the macro eNB are provided with a cell ID identical to each other, as mentioned earlier, a UE recognizes each of the RRHs and the macro eNB as a single cell. The UE receives data from each of the RRHs and the macro eNB. In case of a data channel, a precoding, which is used to transmit data of each UE, is simultaneously applied to a reference signal as well. Hence, each UE can estimate an actual channel of its own on which the data is transmitted. In this case, the reference signal to which the precoding is applied corresponds to the aforementioned DM-RS.

As mentioned in the foregoing description, a UE of a legacy LTE system performs channel estimation by a CRS only. By doing so, the UE performs both data demodulation and channel status information feedback via the CRS. Besides, the UE performs such RRM (radio resource management) measurement as cell tracking, frequency offset compensation, synchronization, RSSI (received signal strength indicator)/RSRP (reference signal received power)/RSRQ (reference signal received quality) and the like via the CRS.

Meanwhile, in case of a UE of a LTE-A system, a conventional role of the CRS is expanded in a manner that a DM-RS takes charge of roles related to the channel estimation and the data demodulation and a CSI-RS takes charge of a role related to the channel status information feedback. Yet, remaining functions are still performed by the CRS.

In case that a UE performs an operation of measuring a signal of a cell (or a transmission point not having a separate cell ID), the present invention proposes a method of using a CSI-RS for the channel status information feedback.

Figure 11:
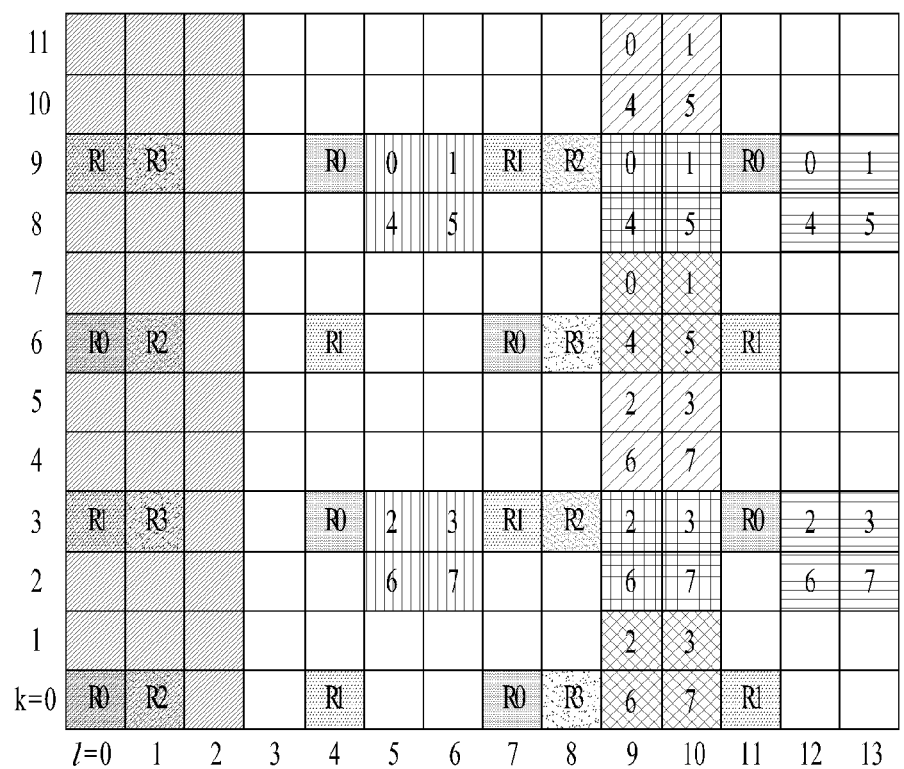
FIG. 11 is a diagram for an example of a CSI-RS pattern defined by 3GPP standard.

FIG. 11 is a diagram for an example of a CSI-RS pattern defined by 3GPP standard. In particular, FIG. 11 shows an example of a CSI-RS pattern defined by 8 antenna ports.

Referring to FIG. 11, a CSI-RS for a single antenna port is transmitted in a manner of being spread over two OFDM symbols, two CSI-RSs share two REs and are distinguished from each other using an orthogonal code. For instance, REs represented by a number 0 and 1 indicate two REs in which a CSI-RS antenna port 0 and 1 are transmitted.

For clarity, the present invention uses such an expression as the CSI-RS antenna port 0 and 1. In order to distinguish the CSI-RS from such a different kind of RS as a CRS and a DM-RS, the CSI-RS antenna port 0, 1 and the like may have such an index as an antenna port 15, 16 and the like. The CSI-RS can be defined by 1 antenna port, 2 antenna ports or four antenna ports except the 8 antenna ports.

In general, the CSI-RS is intermittently transmitted in a part of subframes instead of being transmitted in every subframe. And, since density of each CSI-RS antenna port is lower than density of a CRS antenna port, if a UE performs measurement of RSRP/RSRQ and the like for a specific cell or a transmission point using the CSI-RS, since an energy of a signal becoming a target of the measurement is not sufficient, measurement accuracy may be deteriorated.

In particular, in case that a cell or a transmission point transmits a CSI-RS using one or two antenna ports, since energy occupied by the CSI-RS is two REs per a PRB pair only, the aforementioned problem may become worse. Or, although the CSI-RS itself occupies many numbers of antenna ports, if the cell or the transmission point performs measurement using a part of the many numbers of antenna ports, for instance, in case of measuring an antenna port assigned to a specific transmission point only to measure a signal strength of the specific transmission point, the aforementioned problem may occur as well.

In order to solve the problem, in case of performing measurement based on the CSI-RS, the present invention proposes to perform the measurement in a manner of binding a plurality of antenna ports with each other. In this case, binding a plurality of the antenna ports with each other means to calculate RSRP (reference signal received power)/RSRQ (reference signal received quality)/pathloss and the like after coherent combining is performed under an assumption that the CSI-RS transmitted from a plurality of the antenna ports is transmitted from an identical antenna, i.e., the CSI-RS transmitted from a plurality of the antenna ports has passed through an identical channel.

Figure 12:
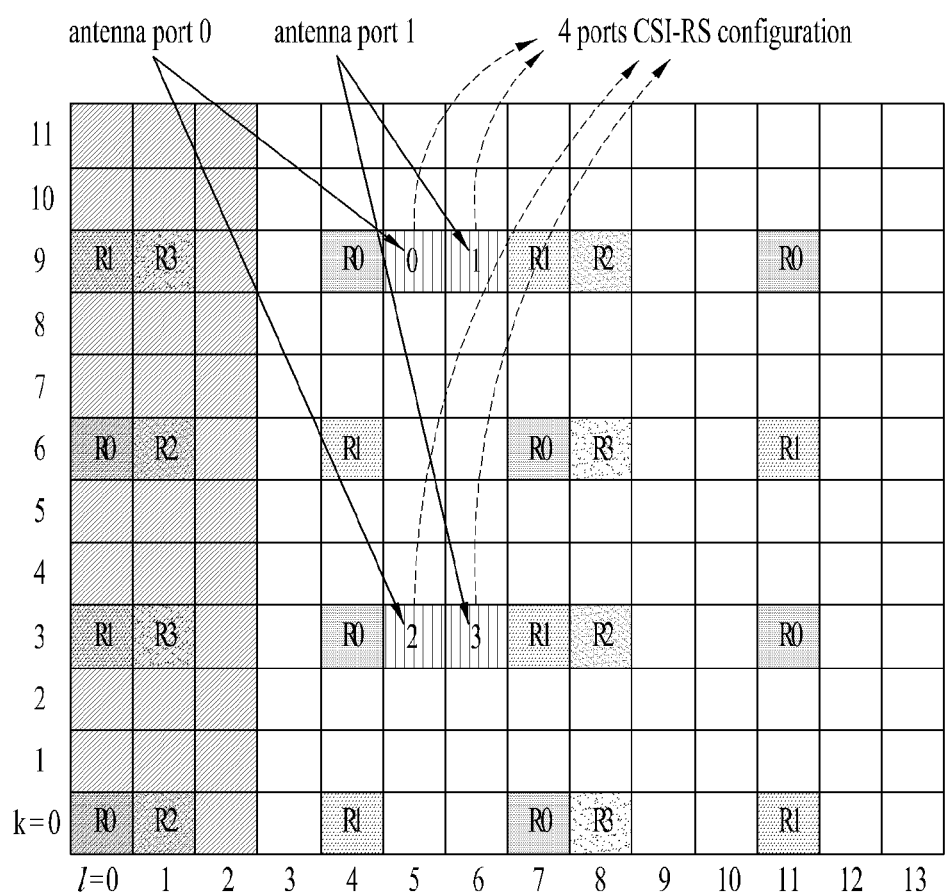
FIG. 12 is a diagram for an example of configuring an antenna port of a CSI-RS according to a method of performing measurement by binding a plurality of antenna ports.

FIG. 12 is a diagram for an example of configuring an antenna port of a CSI-RS according to a method of performing measurement by binding a plurality of antenna ports.

Referring to FIG. 12, although a cell or a transmission point including two antenna ports configures 4 antenna ports CSI-RS, an antenna port 0 and 2 and an antenna port 1 and 3 are transmitted from an identical antenna. In this case, since a UE can perform a coherent combining for a CSI-RS of the antenna port 0 and 2 and a CSI-RS of the antenna port 1 and 3, respectively, measurement accuracy can be enhanced.

In particular, this sort of operation enables a transmission point to perform measurement using great amounts of energy when the transmission point has a limitation in boosting power of a specific CSI-RS RE due to a limitation for an amplifier of the transmission point and the like.

To this end, an eNode B can inform a UE of a set of antenna ports, which is capable of being assumed by the UE for coherent combining, via such an upper layer signal as RRC and the like. More generally, a cell can inform the UE of a relation of a CSI-RS between antenna ports via such an upper layer signal as an RRC and the like. For instance, the cell can inform the UE of whether an identical CSI-RS is repeated, spreading sequence or the like.

In case of performing the aforementioned operation, the eNode B can inform the UE of the number of antenna ports or a set of the antenna ports, which are to be used when the UE calculates such CSI information as PMI or CQI, via an additional signal.

For instance, referring to FIG. 12, since the eNode B uses two transmission antennas, the eNode B can indicate the UE to use a codebook designed for the two transmission antennas when the UE reports PMI to the eNode B. Of course, as mentioned in the foregoing description, the UE can determine PMI appropriate for the UE based on the measurement obtained after the coherent combining is performed.

Meanwhile, according to the aforementioned method, the UE can also measure RSRP/RSRQ/pathloss in a manner of combining a plurality of CSI-RS configurations with each other.

Figure 13:
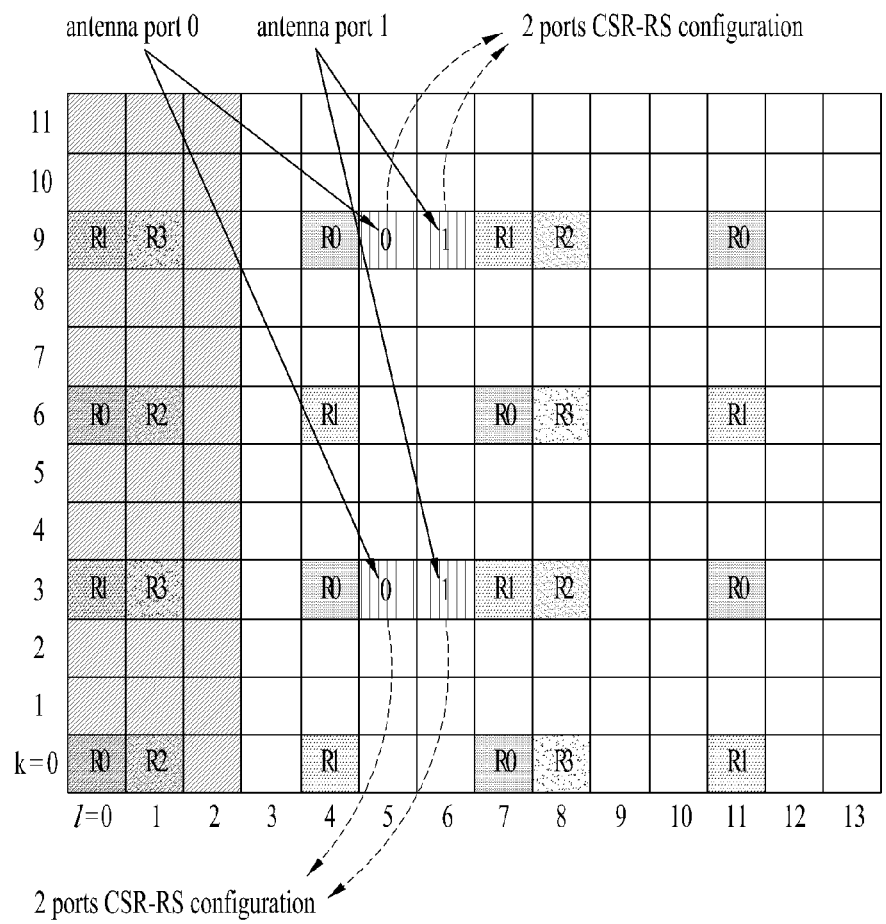
FIG. 13 is a diagram for a different example of configuring an antenna port of a CSI-RS according to one embodiment of the present invention.

FIG. 13 is a diagram for a different example of configuring an antenna port of a CSI-RS according to one embodiment of the present invention.

Referring to FIG. 13, an eNode B signals to a UE for two CSI-RS configurations transmitted in a single cell or a transmission point and informs the UE that the two CSI-RSs indicate an identical antenna port. The UE measures a downlink channel, RSRP/RSRQ/pathloss and the like by combining the two CSI-RSs transmitted from the single cell or the transmission point with each other.

In this case, relative positions of the two CSI-RSs can be determined in advance. For instance, as depicted in FIG. 13, if two antenna ports CSI-RS are repeated twice, a position of a second CSI-RS may become a position in which an antenna port 2 and 3 are transmitted in 4 antenna ports CSI-RS.

More generally, if an n antenna port CSI-RS is repeated N times, a repeated position of the n antenna port CSI-RS can be determined with an RE occupied by n*N antenna port CSI-RS including an RE of the n antenna port CSI-RS.

In the foregoing description, a method of performing measurement for RSRP/RSRQ/pathloss, which is performed by the UE by binding a plurality of antenna ports, has been explained. In the following description, a method of utilizing a scheme of biding a plurality of the antenna ports is explained in order for the UE to measure a size of an interference signal in a CoMP transmission scheme.

Figure 14:
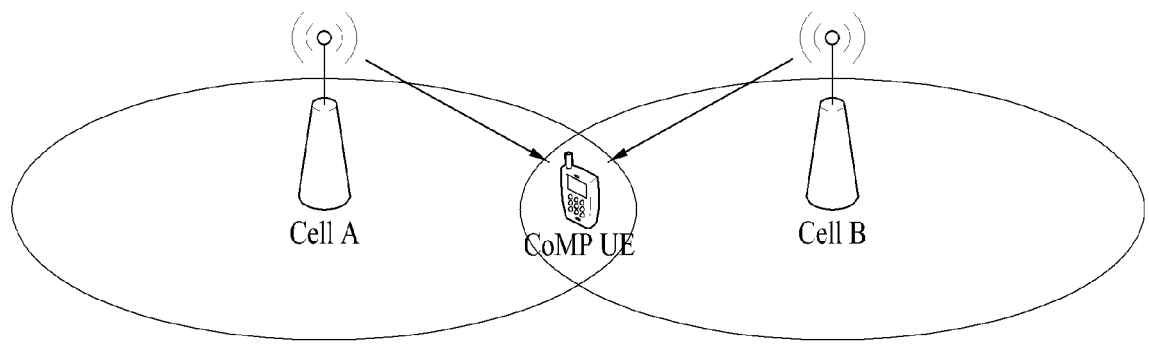
FIG. 14 is a diagram for a situation of performing a coordinated communication, which is performed by a cell A and a cell B with a CoMP terminal belonging to the cell A, to explain embodiment of measuring strength of an interference signal of the present invention.

FIG. 14 is a diagram for a situation of performing a coordinated communication, which is performed by a cell A and a cell B (or a TP A and a TP B) with a CoMP terminal belonging to the cell A, to explain embodiment of measuring strength of an interference signal of the present invention. In particular, the cell A is operating as a serving cell.

In this circumstance, the CoMP terminal can estimate each downlink channel via CSI-RSs received from each of the cells. As mentioned earlier with reference to FIG. 12, the CoMP terminal can increase the degree of accuracy of channel estimation by performing measurement in a manner of binding a plurality of antenna ports with each other. Having completed the measurement, the CoMP terminal generates CSI information consisting of RI, PMI and/or CQI based on a measurement result and can feedback a generated result to an eNode B.

In a coordinated transmission circumstance using the CoMP transmission scheme, it is necessary for the UE to measure a size of an interference signal in a manner of assuming various environments. This is because if the CoMP transmission scheme is used, interference between cells participating in the CoMP transmission scheme can be considerably reduced or disappeared according to a CoMP transmission technique. If the inter-cell interference is considerably reduced or disappeared, CQI should be calculated in a manner of reflecting the change of the interference in the CQI.

Referring to FIG. 14, if the cell B participates in a cooperative communication except the cell A corresponding to a serving cell, an interference signal of the cell B affecting the CoMP terminal is reduced or disappeared. Hence, the CoMP terminal should calculate CQI in a manner of reflecting the interference signal reduced from the cell B in the CQI.

A strength of an interference signal affected by a coordinated cell varies according to a CoMP transmission technique as follows. (1) In case of using a DPS (DPS with muting) technique accompanied by JT or muting, interference form a coordinated cell is completely disappeared. (2) In case of using the DPS (DPS without muting) technique not accompanied by muting, interference from a coordinated cell exists as it is without being reduced. (3) In case of using CS/CB technique, the CoMP terminal receives little or no interference.

In particular, in a general circumstance instead of a CoMP circumstance, a size of an interference signal from all cells except a serving cell should be measured. Yet, in the CoMP circumstance, the size of the interference signal should be measured in a manner of excluding interference from a part of cells (depending on a CoMP transmission technique currently being used).

Consequently, in a coordinated transmission circumstance using the CoMP transmission scheme, it is necessary for a UE to measure a size of an interference signal by assuming various environments (interference from a coordinated cell and/or no interference from the coordinated cell).

In general, in order to measure a size of an interference signal, a UE regenerates a reception desired signal based on a channel estimated from an RS and estimates the reference signal in a manner of extracting the regenerated reception desired signal from a reception signal. Since the reception desired signal and the interference signal are mingled in the reception signal, if the regenerated reception desired signal is extracted from the reception signal, it may obtain the interference signal only.

One embodiment of the present invention proposes to use the aforementioned method of measuring a size of an interference signal and mute a part of REs received from a coordinated cell to assume various environments of the CoMP transmission scheme. Regarding this, it shall be described in detail with reference to FIG. 15a to FIG. 15b in the following.

Figure 15A:
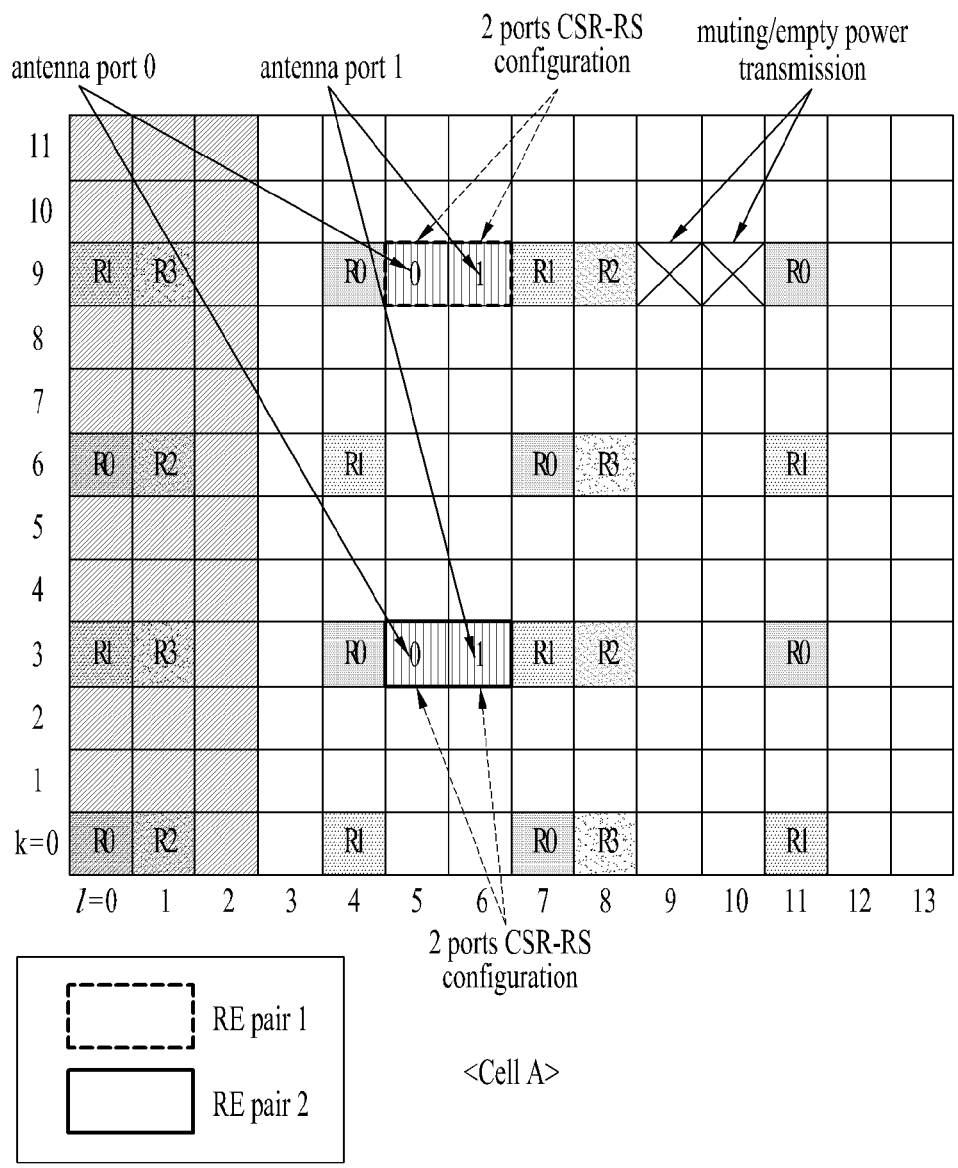
FIG. 15a and FIG. 15b are diagrams for a method of muting a part of REs among CSI-RS patterns received from two cells in CoMP situation according to one embodiment of the present invention.
Figure 15B:
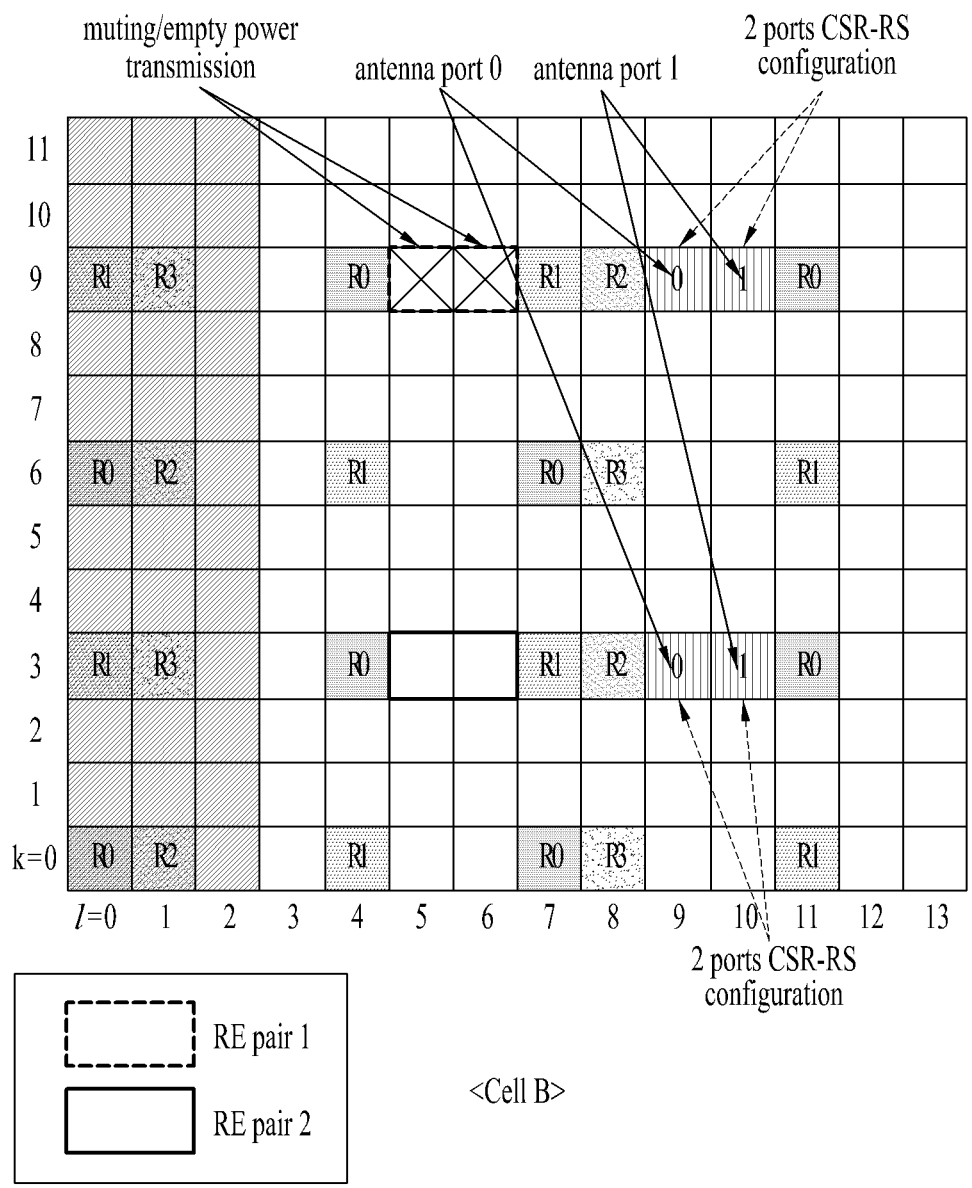

FIG. 15a and FIG. 15b are diagrams for a method of muting a part of REs among CSI-RS patterns received from two cells in CoMP situation according to one embodiment of the present invention. FIG. 15a is a diagram for a CSI-RS pattern received from a cell A corresponding to a serving cell and FIG. 15b is a diagram for a CSI-RS pattern received from a cell B corresponding to a coordinated cell for an identical frequency time resource. In FIG. 15a and FIG. 15b, a time resource and a frequency resource correspond to a horizontal axis and a vertical axis, respectively. In remaining symbols except 0, 1 and 2 symbol in which control information exists, empty REs represented by white color correspond to the REs in which data is transmitted.

An RE pair 1 depicted by a dotted line box indicates a position of an antenna port 0 and 1 of a CSI-RS received from the cell A. An RE pair 2 depicted by a line box indicates a position of an antenna port 2 and 3 (in case of configuring 4 ports CSI-RS). As mentioned earlier with reference to FIG. 13 and FIG. 14, an eNode B can inform a UE of the RE pair 1 and the RE pair 2 by following method. The eNode B informs the UE of two 2 ports CSI-RS configurations and informs the UE that the two CSI-RSs indicate an identical port. Or, the eNode B informs the UE of one 4 ports CSI-RS and informs the UE that a port 2 and a port 3 of the one CSI-RS are identical to a port 0 and a port 1, respectively.

First of all, as mentioned earlier in FIG. 13, in case of configuring a 2 ports CSI-RS, the RE pair 2 can be transmitted again by an antenna port 0 and 1. More specifically, in a CSI-RS pattern depicted in FIG. 15a and FIG. 15b, 2 antenna ports CSI-RS is repeated twice. While the 2 ports CSI-RS is configured, a first CSI-RS in which CDM (code division multiplexing) is performed for the antenna port 0 and 1 is transmitted in a position of the RE pair 1 and a second CSI-RS for an identical antenna port can be transmitted in a position of the RE pair 2. Hence, as mentioned in the foregoing description, a UE measures a downlink channel, RSRP/RSRQ/pathloss and the like in a manner of combining two CSI-RSs received in twice with each other. By doing so, a measurement result may become more accurate.

As a different scheme, as mentioned earlier in FIG. 14, in case of configuring a 4 ports CSI-RS, the RE pair 2 can be transmitted again by the antenna port 2 and 3. Yet, since the UE and the eNode has promised that an antenna port 2 and 3 correspond to ports identical to an antenna port 0 and 1, the UE measures a downlink channel, RSRP/RSRQ/pathloss and the like in a manner of combining a CSI-RS of the antenna port 0 and 1 and a CSI-RS of the antenna port 2 and 3. By doing so, a measurement result may become more accurate.

Besides the measurement of the downlink channel, RSRP/RSRQ/pathloss and the like of a channel itself, which has received the CSI-RS using the CSI-RS received in twice, one embodiment of the present invention further proposes a scheme for the UE to measure interferences different from each other for a CSI-RS, which is repeated to enable various interferences to be measured. As mentioned in the foregoing embodiment, in case that an eNode B has informed a UE of a 4 ports CSI-RS configuration, the UE can measure two or more types of interference indicating interference environments different from each other in the 4 ports CSI-RS. Or, as mentioned in the foregoing embodiment, in case that the eNode B has informed the UE of two 2 ports CSI-RS configurations, the UE can measure two or more types of interference indicating interference environments different from each other in each CSI-RS.

In the CSI-RS pattern received from the cell A corresponding to the serving cell, areas respectively corresponding to the RE pair 1 and the RE pair 2 are also depicted in the CSI-RS pattern received from the cell B. According to what is proposed by the present invention, if the RE pair 1 and the RE pair 2 are configured by a practically identical CSI-RS port, the RE pair 1, which is received from a neighboring cell (the cell B in FIG. 15) participating in CoMP, is muted and the RE pair 2 transmits PDSCH of a cell of the RE pair 2. Moreover, if the RE pair 1 and the RE pair 2 are configured by a practically different CSI-RS port, the RE pair 1, which is received from a neighboring cell (the cell B in FIG. 15) participating in CoMP, is muted and the RE pair 2 can transmit PDSCH of a cell of the RE pair 2.

Since a CSI-RS is received from the cell A corresponding to a serving cell in a position of the RE pair 1 and a muted signal is received from the cell B corresponding to a coordinated cell in a position of the RE pair 1, a UE can indicate a strength of an interference signal under an assumption that there is no interference from the coordinated cell (e.g., in case of using JT technique among CoMP techniques) according to the interference signal measured from a signal received from the RE pair 1.

Since a CSI-RS is received from the cell A corresponding to a serving cell in a position of the RE pair 2 and a PDSCH signal is received from the cell B corresponding to a coordinated cell in a position of the RE pair 2, the UE can indicate a strength of an interference signal under an assumption that there is interference from the coordinated cell (e.g., in case of using DPS without muting technique among CoMP techniques) according to the interference signal measured from a signal received from the RE pair 2.

The CoMP terminal receives a fact that a CSI-RS signal for an identical port is transmitted to the RE pair 1 and the RE pair 2 from the eNode B. Moreover, the CoMP terminal receives a fact that interference signals different from each other are received by the RE pair 1 and the RE pair 2, respectively.

In summary, in case of estimating a channel using a CSI-RS and in case of estimating a size of an interference signal, the UE can differently apply interpretation for the RE pair 1 and the RE pair 2.

In case of estimating a channel, signals received from the two RE pairs are appropriately interpolated in a manner of assuming that an identical channel is measured from the two RE pairs. By doing so, the appropriately interpolated signals are used for the use of increasing the degree of accuracy for the channel estimation.

In case of estimating a size of an interference signal, an interference signal in which all interference are eliminated from a serving cell and a coordinated cell is measured in a manner of extracting a CSI-RS reception signal from a signal received in the RE pair 1. And, a strength of an interference signal in which interference of the serving cell is eliminated is measured in a manner of extracting the CSI-RS reception signal from a signal received in the RE pair 2.

In order to explain embodiment of the present in more detail, the embodiment of the present invention mentioned earlier with reference to FIG. 15a and FIG. 15b is explained in a manner of being divided into an operation of an eNode B and an operation of a UE in the following.

<Operation of eNode B>

The aforementioned embodiment of the present invention is explained in detail in terms of an operation of an eNode B.

A cell A, which corresponds to a serving cell of a CoMP terminal, signals to the CoMP terminal that a CSI-RS for an identical port is transmitted to the RE pair 1 and the RE pair 2 and the RE pair 1 and the RE pair 2 are respectively used for calculating two CQIs different from each other in terms of assumption of interference received from a cell B. For instance, the CQI of the cell A can be classified into a CQI 1 including interference from the cell B corresponding to a coordinated cell and a CQI2 from which interference is completely eliminated. The cell A can signal to the UE that the CQI 1 and the CQI 2 are calculated based on an interference signal measured from the RE pair 1 and an interference signal measured from the RE pair 2, respectively. Or, the eNode B can make the UE calculate and feedback either the CQI 1 or the CQI 2 and can inform the UE of a designated RE pair used for measuring the interference signal.

In case of transmitting a CSI-RS of the cell A for a different port to the CoMP terminal via the RE pair 1 and the RE pair 2, it may also signal that the RE pair 1 and the RE pair 2 are used for calculating two CQIs different from each other in terms of assumption of interference received from the cell B.

An identical operation can be applied to the cell B as well. The eNode B signals CSI-RS information of the cell B and two types of interference signal capable of being received from the cell A in a corresponding RE to the CoMP terminal. In case that two RE pairs in which the CSI-RS information of the cell B is received correspond to a RE pair 1' and a RE pair 2', information on how interference signals measured from the two RE pairs are mapped to CQI calculation should be additionally transmitted. Referring to examples depicted in FIG. 15a and FIG. 15b, the cell A performs muting in the RE pair 1' and can transmit PDSCH in the RE pair 2'.

Meanwhile, in order to implement embodiment of the present invention, since there is a part contradicted with a specification of current LTE-A, it should be revised. In particular, according to the specification of current LTE-A, an RE pair consisting of a 4 ports CSI-RS is limited to transmit no PDSCH or to transmit all PDSCHs. In other word, it is necessary to revise a resource unit used for muting PDSCH to be configured in more detail. And, it is necessary to revise small size resource information in which the PDSCH is muted to be signaled to a UE by an eNode via a control signal. Referring to the examples depicted in FIG. 15a and FIG. 15b, the UE receives the control signal and may be then able to recognize that the PDSCH can be transmitted to the RE pair 2' configured with the CSI-RS. In this case, if data is transmitted to the RE pair 2' from the eNode B, it is called a decoding. In this case, in order to increase success rate of the data decoding, the CSI-RS is preferentially decoded and interference coming from the CSI-RS can be eliminated via a successful interference cancellation operation.

<Operation of UE>

The aforementioned embodiment of the present invention is explained in detail in term of an operation of a UE.

A CoMP terminal precisely estimates a downlink channel of a cell A using both a RE pair 1 and a RE pair 2 in which an identical CSI-RS is configured. (If different ports are configured in the RE pair 1 and the RE pair 2, respectively, the CoMP terminal estimates channel information of different ports from the RE pair 1 and the RE pair 2, respectively.) In order to estimate an interference signal to be used for CQI calculation later, one of the two RE pairs is signaled from the cell A and a size of the interference signal is estimated via the aforementioned method. (If interference of a coordinated cell affecting the RE pair 1 and the RE pair 2 is identical to each other, one interference signal can also be measured by using both the RE pair 1 and the RE pair 2 at the same time.)

If an eNode B commands to feedback a plurality of CQIs including interference environments different from each other, the UE calculates CQI in a manner that the eNode B designates a RE pair used for estimating an interference signal when each of a plurality of the CQIs is calculated. For instance, when it is beneficial to calculate CQI including no interference from both cells such as a JT or a DPS technique with muting, in case of calculating a desired channel, it is preferable to use both the RE pair 1 and the RE pair 2 to increase the degree of accuracy of channel estimation. In case of calculating an interference signal, it is preferable to use the RE pair 1 only. On the contrary, when a DPS technique without muting is used, in case of calculating an interference signal, it is preferable to use the RE pair 2 only in which interference from the cell B is still existing to calculate CQI. When CQI on the cell B is calculated, the CoMP terminal can identically apply the method, which is applied to the cell A.

Meanwhile, in explaining one embodiment of the present invention, although it is assumed that a neighboring cell participating in a cooperation gives a different interference according to an RE pair in a manner of binding two REs into one RE pair, a unit in which a different interference environment is configured is not limited to the RE pair. Instead, a random RE group may become the unit in which a different interference environment is configured. And, when a position of the RE pair is designated, it is not necessary to match the position of the RE pair with an RE position of a 4 ports CSI-RS. It is apparent that an identical method can also be applied to a different RE position. Moreover, although FIG. 15a and FIG. 15b show an example that two 2 ports CSI-RSs are configured, it is apparent that an identical method can also be applied to a case (FIG. 12) in which a 4 ports CSI-RS is configured.

Meanwhile, if a specific RE pair used for measuring an interference signal is not separately signaled or there is no regulation for the specific RE pair, the UE can estimate an interference signal in a manner of considering that both of the RE pairs are lying on an identical interference environment.

In the aforementioned one embodiment of the present invention, although a situation of performing a coordinated transmission performed by two cells is described as an example, the embodiment of the present invention can be identically applied to a situation that three or more cells are cooperating with each other. An example of the aforementioned situation is explained with reference to FIG. 16a to FIG. 16c in the following.

Figure 16A:
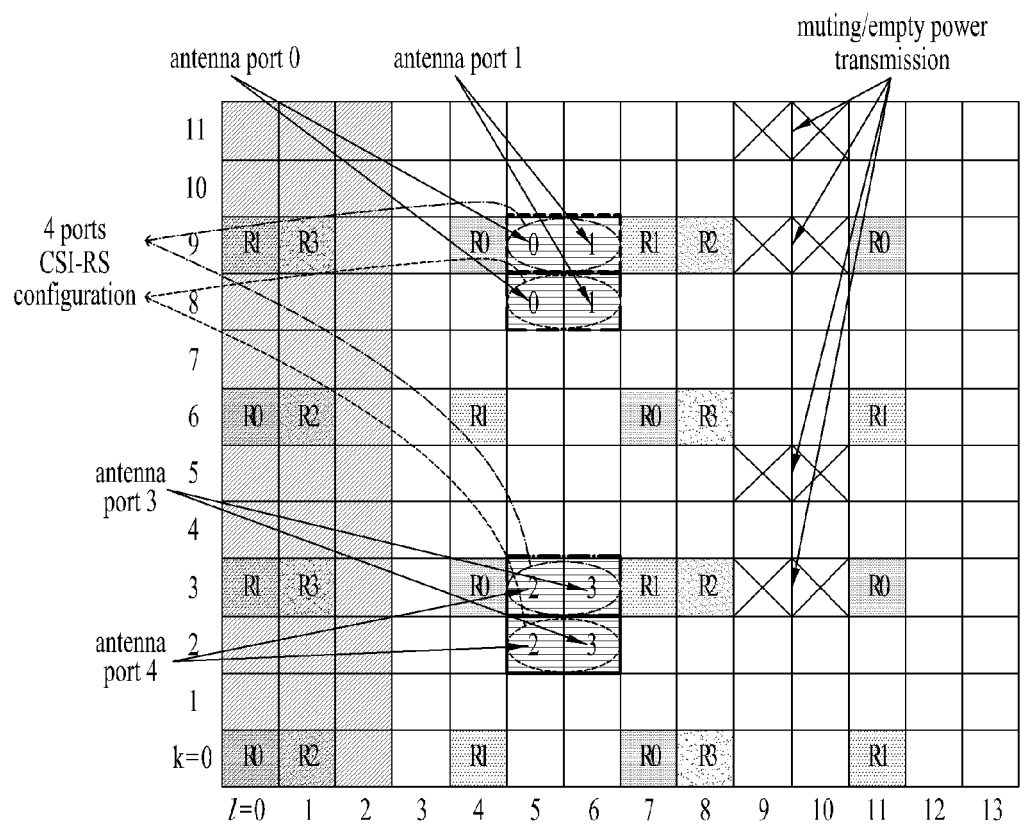
FIG. 16a to FIG. 16c are diagrams for a method of muting a part of REs among CSI-RS patterns received from three cells in CoMP situation according to one embodiment of the present invention.
Figure 16A:
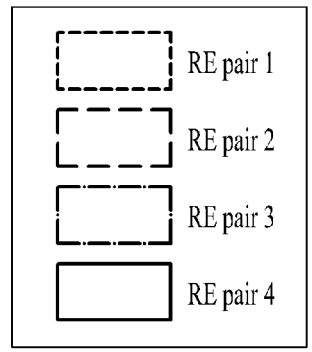
Figure 16B:
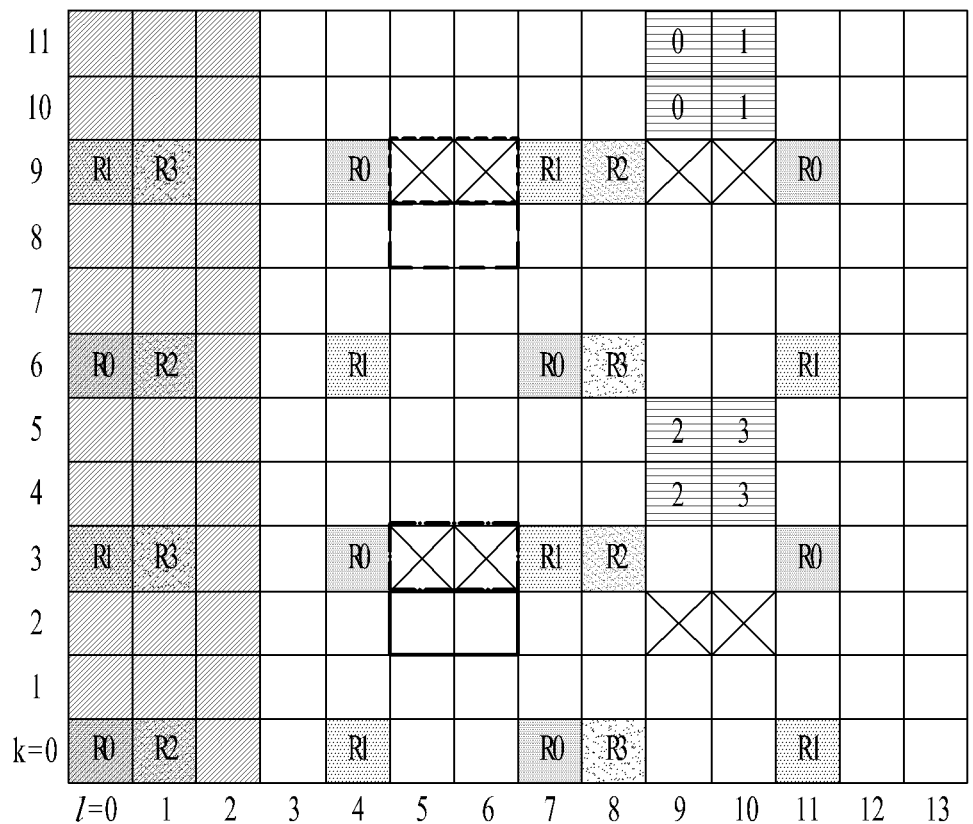
Figure 16B:
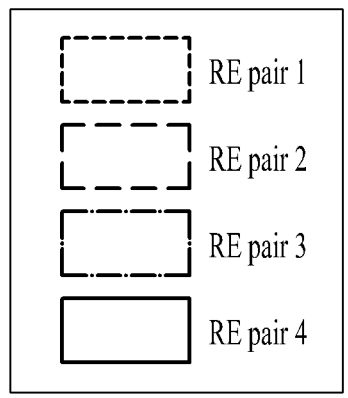
Figure 16C:
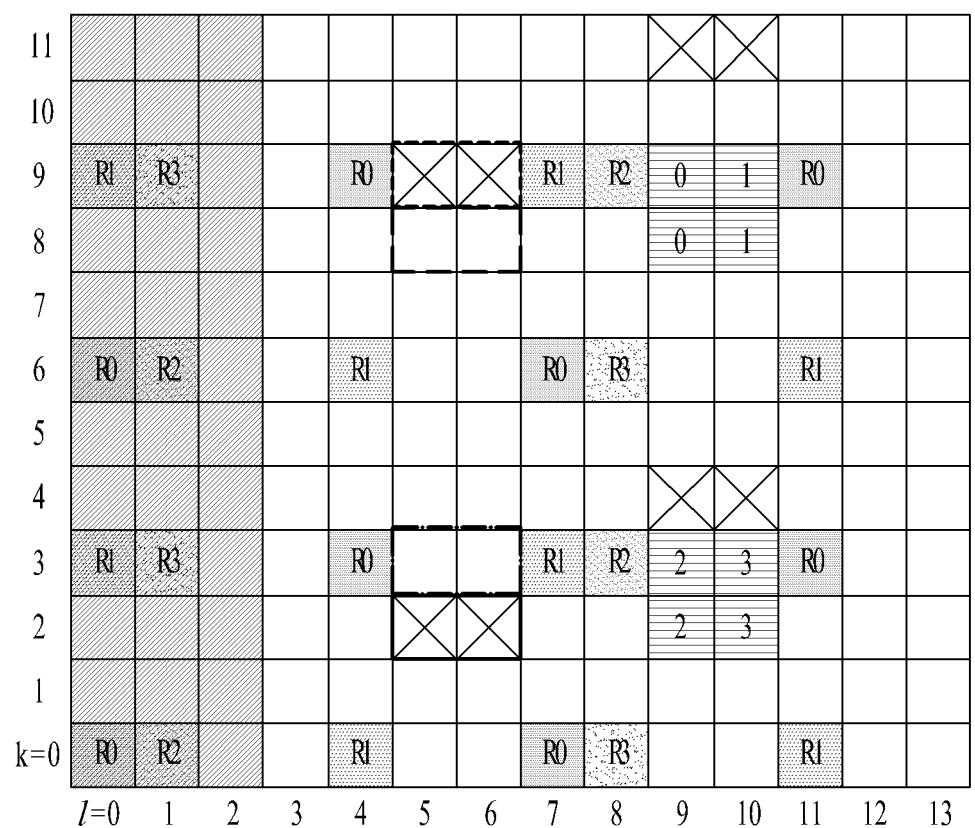
Figure 16C:
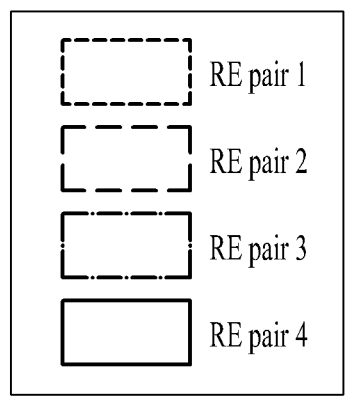

FIG. 16a to FIG. 16c are diagrams for a method of muting a part of REs among CSI-RS patterns received from three cells in CoMP situation according to one embodiment of the present invention. Referring to FIG. 16a to FIG. 16c, each cell is configured with a 4 ports CSI-RS and two 4 ports CSI-RSs identical to each other are configured to make CSI-RS density higher. Of course, after configuring 8 ports CSI-RS, an eNode B can inform the UE that a $19^{th}$, $20^{th}$, $21^{st}$ and $22^{nd}$ port corresponding to lower four antenna ports respectively correspond to ports identical to a $15^{th}$, a $16^{th}$, a $17^{th}$ and $18^{th}$ port corresponding to upper four antenna ports. In this case, there may exist 4 RE pairs capable of measuring interference environments different from each other. These RE pairs are represented in FIG. 16a to FIG. 16c as a RE pair 1, 2, 3 and 4, respectively. The CoMP terminal estimates a downlink channel from the cell A using a CSI-RS and may be then able to measure various interference signals by eliminating the estimated reception CSI-RS from an RE pair. For instance, an interference signal from remaining cell except A, B and C cell can be measured in an RE pair 1 via calculation of obtaining a size of the interference signal. An interference signal from remaining cell except the A cell can be measured in an RE pair 2. An interference signal from remaining cell except the A cell and the B cell can be measured in an RE pair 3. An interference signal from remaining cell except the A cell and the C cell can be measured in an RE pair 4.

The aforementioned present invention may not be limited to a CSI-RS. It is apparent that the present invention can also be applied to measurement via a CRS.

Figure 17:
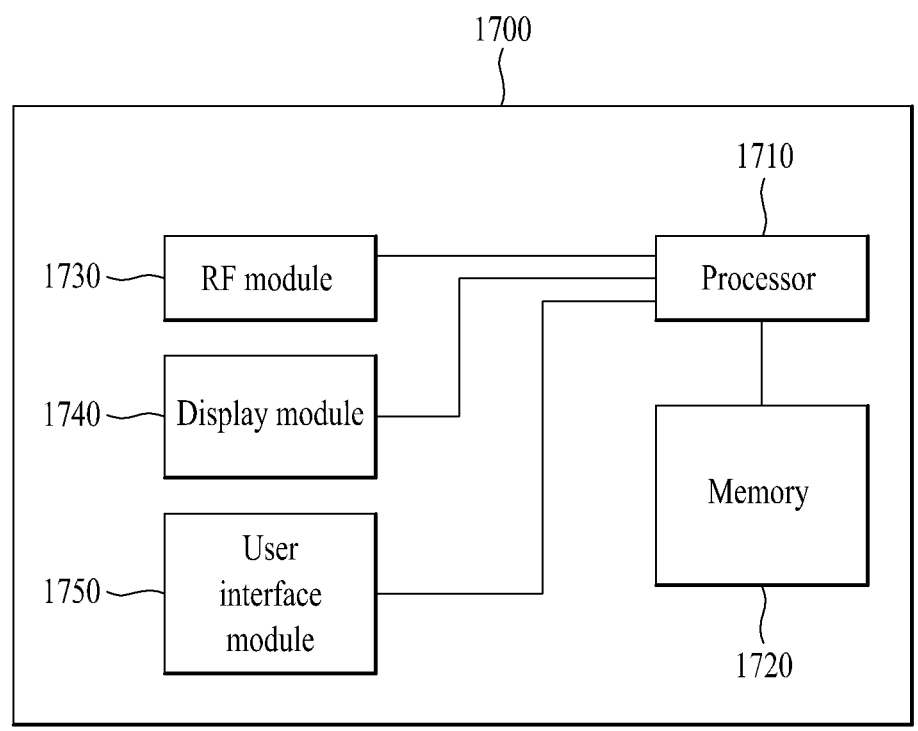
FIG. 17 is a block diagram for a communication device according to one embodiment of the present invention.

FIG. 17 is a block diagram for a communication device according to one embodiment of the present invention.

Referring to FIG. 17, a communication device 1700 includes a processor 1710, a memory 1720, an RF module 1730, a display module 1740 and a user interface module 1750.

Since the communication device 1700 is depicted for clarity of description, prescribed module(s) may be omitted in part. The communication device 1700 may further include necessary module(s). And, a prescribed module of the communication device 2800 may be divided into subdivided modules. A processor 1710 is configured to perform an operation according to the embodiments of the present invention illustrated with reference to drawings. In particular, the detailed operation of the processor 1710 may refer to the former contents described with reference to FIG. 1 to FIG. 16.

The memory 1720 is connected with the processor 1710 and stores an operating system, applications, program codes, data, and the like. The RF module 1730 is connected with the processor 1710 and then performs a function of converting a baseband signal to a radio signal or a function of converting a radio signal to a baseband signal. To this end, the RF module 1730 performs an analog conversion, amplification, a filtering, and a frequency up conversion, or performs processes inverse to the former processes. The display module 1740 is connected with the processor 1710 and displays various kinds of informations. And, the display module 1740 can be implemented using such a well-known component as an LCD (liquid crystal display), an LED (light emitting diode), an OLED (organic light emitting diode) display and the like, by which the present invention may be non-limited. The user interface module 1750 is connected with the processor 1710 and can be configured in a manner of being combined with such a well-known user interface as a keypad, a touchscreen and the like.

The above-described embodiments correspond to combinations of elements and features of the present invention in prescribed forms. And, the respective elements or features may be considered as selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

In this disclosure, a specific operation explained as performed by an eNode B may be performed by an upper node of the eNode B in some cases. In particular, in a network constructed with a plurality of network nodes including an eNode B, it is apparent that various operations performed for communication with a UE can be performed by an eNode B or other networks except the eNode B. 'Base station (BS)' may be substituted with such a terminology as a fixed station, a Node B, an eNode B (eNB), an access point (AP) and the like.

Embodiments of the present invention can be implemented using various means. For instance, embodiments of the present invention can be implemented using hardware, firmware, software and/or any combinations thereof. In the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various means known in public.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

Although a method of estimating strength of an interference signal based on a CSI-RS in a wireless communication system and apparatus therefor are described with reference to examples applied to 3GPP LTE system, it may be applicable to various kinds of wireless communication systems as well as to the 3GPP LTE system.

What is claimed is:
1. A method of measuring strength of an interference signal from a first eNode B measured by a user equipment in a CoMP (coordinated multipoint) environment, the method comprising:

receiving a plurality of CSI-RSs (channel status information-reference signals) from a second eNode B using a first resource element (RE) pair and a second RE pair;

receiving a downlink signal from the first eNode B using the first RE pair and the second RE pair; and measuring a plurality of interference strengths based on a plurality of the CSI-RSs and the received downlink signal, wherein the first RE pair is muted and the second RE pair is an allocated PDSCH (physical downlink shared channel) of the first eNode B when the first RE pair and the second RE pair are configured by an identical antenna port.

2. The method of claim 1, wherein if interference strengths are measured based on the first RE pair, the interference strengths indicate strengths of an interference signal under an environment of no interference from the first eNode B.

3. The method of claim 1, wherein each of a plurality of the RE pairs occupies a position identical to a position of a corresponding CSI-RS on a frequency-time resource.

4. The method of claim 1, the method further comprising: calculating a plurality of CQIs (channel quality indicators) based on the measured plurality of interference strengths.

5. The method of claim 4, the method further comprising: reporting a calculated plurality of CQIs to the second eNode B.

6. A user equipment device measuring strength of an interference signal from a first eNode B in a CoMP (coordinated multipoint) environment, the user equipment device comprising:

a wireless communication module configured to transceive a signal with eNode Bs; and a processor configured to access the wireless communication module and control an operation of the user equipment device, wherein the processor is further configured to receive a plurality of CSI-RSs (channel status information-reference signals) from a second eNode B via the wireless communication module using a first resource element (RE) pair and a second RE pair, receive a downlink signal from the first eNode B via the wireless communication module using the first RE pair and the second RE pair, and measure a plurality of interference strengths based on a plurality of the CSI-RSs and the received downlink signal, and wherein the first RE pair is muted and the second RE pair is an allocated PDSCH (physical downlink shared channel) of the first eNode B when the first RE pair and the second RE pair are configured by an identical antenna port.

7. The user equipment device of claim 6, wherein if interference strengths are measured based on the first RE pair, the interference strengths indicate strengths of an interference signal under an environment of no interference from the first eNode B.

8. The user equipment device of claim 6, wherein each of a plurality of the RE pairs occupies a position identical to a position of a corresponding CSI-RS on a frequency-time resource.

9. The user equipment device of claim 6, wherein the processor is further configured to calculate a plurality of CQIs (channel quality indicators) based on the measured plurality of interference strengths.

10. The user equipment device of claim 9, wherein the processor is further configured to report the calculated plurality of CQIs to the second eNode B.

* * * * *